United States Patent
Doane et al.

(10) Patent No.: US 9,965,768 B1
(45) Date of Patent: May 8, 2018

(54) LOCATION-BASED MOBILE ADVERTISING

(75) Inventors: Andrew J Doane, Vienna, VA (US); William F Murray, Arlington, VA (US); Kevin C Miller, Herndon, VA (US)

(73) Assignee: Amazon Technologies, Inc., Reno, NV (US)

( * ) Notice: Subject to any disclaimer, the term of this patent is extended or adjusted under 35 U.S.C. 154(b) by 286 days.

(21) Appl. No.: 13/111,920

(22) Filed: May 19, 2011

(51) Int. Cl.
*G06Q 30/02* (2012.01)

(52) U.S. Cl.
CPC ..... *G06Q 30/0222* (2013.01); *G06Q 30/0251* (2013.01)

(58) Field of Classification Search
CPC .................................................. G06Q 30/00
See application file for complete search history.

(56) References Cited

U.S. PATENT DOCUMENTS

| | | | |
|---|---|---|---|
| 5,294,472 A | 3/1994 | Arnold et al. |
| 5,914,472 A | 6/1999 | Foladare et al. |
| 6,108,650 A | 8/2000 | Musk et al. |
| 6,173,269 B1 | 1/2001 | Solokl et al. |
| 6,327,348 B1 | 12/2001 | Walker et al. |
| 6,343,279 B1 | 1/2002 | Bissonette et al. |
| 6,505,046 B1 | 1/2003 | Baker |
| 6,597,770 B2 | 7/2003 | Walker et al. |
| 6,738,749 B1 | 5/2004 | Chasko |
| 6,756,879 B2 | 6/2004 | Shuster |
| 7,392,534 B2 | 6/2008 | Lu et al. |

(Continued)

FOREIGN PATENT DOCUMENTS

| | | |
|---|---|---|
| CN | 101689268 | 3/2010 |
| CN | 101919274 | 12/2010 |

(Continued)

OTHER PUBLICATIONS

Non-Final Office Action for U.S. Appl. No. 13/052,930, dated Jan. 2, 2013, Gregory M. Hart et al., "Advertisement Service", 19 pages.

(Continued)

*Primary Examiner* — Rutao Wu
*Assistant Examiner* — Michael J Cross
(74) *Attorney, Agent, or Firm* — Kilpatrick Townsend & Stockton LLP

(57) ABSTRACT

An advertisement service enables advertisers to bid on or select a particular geographic region for public display of an advertisement by a mobile ad platform when the mobile ad platform enters the particular geographic region. For instance, the mobile ad platform provides location information to the advertisement service. Based on the location, the advertisement service provides ad information to the mobile ad platform for display of an advertisement corresponding to the advertiser that has purchased rights to display advertisements on the mobile ad platform in the current geographic region. The publicly displayed advertisement content may change dynamically as the location of the mobile ad platform changes. In some implementations, the advertisement may offer an incentive, such as a coupon, to consumers that see the advertisement. The incentive may be redeemable at the advertiser's business such as by using a mobile device to capture, obtain or redeem the incentive.

29 Claims, 11 Drawing Sheets

(56) References Cited

U.S. PATENT DOCUMENTS

| | | |
|---|---|---|
| 7,434,723 B1 | 10/2008 | White et al. |
| 7,657,489 B2 | 2/2010 | Stambaugh |
| 7,725,390 B2 | 5/2010 | Plant |
| 7,739,197 B2 | 6/2010 | Jambunathan et al. |
| 7,788,281 B2 | 8/2010 | Cole et al. |
| 7,813,717 B2 | 10/2010 | Huotari et al. |
| 7,840,222 B2 | 11/2010 | Hampel et al. |
| 7,853,786 B1 | 12/2010 | Fultz et al. |
| 7,873,708 B2 * | 1/2011 | Durand .................. G06Q 30/02 709/219 |
| 7,899,742 B2 | 3/2011 | Benkert et al. |
| 7,900,847 B2 | 3/2011 | Lindahl et al. |
| 8,050,991 B2 | 11/2011 | Popovic et al. |
| 8,099,109 B2 | 1/2012 | Altman et al. |
| 8,116,731 B2 | 2/2012 | Buhrmann et al. |
| 8,135,624 B1 | 3/2012 | Ramalingam et al. |
| 8,140,403 B2 | 3/2012 | Ramalingam et al. |
| 8,213,898 B2 | 7/2012 | Choti et al. |
| 8,255,698 B2 | 8/2012 | Li |
| 8,326,767 B1 | 12/2012 | Ramanujan et al. |
| 8,447,651 B1 | 5/2013 | Scholl et al. |
| 8,521,131 B1 | 8/2013 | Ramalingam et al. |
| 8,606,322 B2 | 12/2013 | Sabol |
| 8,744,488 B2 | 6/2014 | Cousins et al. |
| 8,849,310 B2 | 9/2014 | Fan et al. |
| 8,863,307 B2 | 10/2014 | Sorek |
| 9,058,604 B2 | 6/2015 | Carr et al. |
| 9,107,064 B1 | 8/2015 | Ramalingam et al. |
| 2001/0025257 A1 | 9/2001 | Sato |
| 2001/0051911 A1 | 12/2001 | Marks et al. |
| 2002/0046116 A1 | 4/2002 | Hohle et al. |
| 2002/0065713 A1 | 5/2002 | Awada et al. |
| 2002/0077876 A1 | 6/2002 | O'Meara et al. |
| 2002/0091568 A1 | 7/2002 | Kraft et al. |
| 2002/0123938 A1 | 9/2002 | Yu et al. |
| 2002/0133467 A1 | 9/2002 | Hobson et al. |
| 2002/0143638 A1 | 10/2002 | August et al. |
| 2003/0159066 A1 | 8/2003 | Staw et al. |
| 2003/0208386 A1 | 11/2003 | Brondrup |
| 2003/0208684 A1 | 11/2003 | Camacho et al. |
| 2003/0212609 A1 | 11/2003 | Blair et al. |
| 2003/0220835 A1 | 11/2003 | Barnes, Jr. |
| 2004/0002897 A1 | 1/2004 | Vishik |
| 2004/0019563 A1 | 1/2004 | Sines et al. |
| 2004/0039694 A1 | 2/2004 | Dunn et al. |
| 2004/0056101 A1 | 3/2004 | Barkan et al. |
| 2004/0093620 A1 | 5/2004 | Iino et al. |
| 2005/0004840 A1 | 1/2005 | Wanninger |
| 2005/0021773 A1 | 1/2005 | Shiga et al. |
| 2005/0177442 A1 | 8/2005 | Sullivan et al. |
| 2005/0221843 A1 | 10/2005 | Friedman et al. |
| 2005/0228719 A1 | 10/2005 | Roberts et al. |
| 2005/0234771 A1 | 10/2005 | Register et al. |
| 2005/0240472 A1 | 10/2005 | Postrel |
| 2005/0267812 A1 | 12/2005 | Jensen et al. |
| 2005/0288719 A1 | 12/2005 | Zhang et al. |
| 2006/0047576 A1 | 3/2006 | Aaltonen et al. |
| 2006/0111955 A1 | 5/2006 | Winter et al. |
| 2006/0164189 A1 | 7/2006 | Tohya et al. |
| 2006/0235795 A1 | 10/2006 | Johnson et al. |
| 2006/0235796 A1 | 10/2006 | Johnson et al. |
| 2006/0242017 A1 | 10/2006 | Libes et al. |
| 2007/0084913 A1 | 4/2007 | Weston |
| 2007/0088610 A1 | 4/2007 | Chen |
| 2007/0118426 A1 | 5/2007 | Barnes, Jr. |
| 2007/0136140 A1 | 6/2007 | Smith, Jr. |
| 2007/0291710 A1 | 12/2007 | Fadell |
| 2008/0004949 A1 | 1/2008 | Flake et al. |
| 2008/0005104 A1 | 1/2008 | Flake et al. |
| 2008/0010121 A1 | 1/2008 | McIntosh |
| 2008/0027810 A1 | 1/2008 | Lerner et al. |
| 2008/0033637 A1 | 2/2008 | Kuhlman et al. |
| 2008/0040233 A1 | 2/2008 | Wildman et al. |
| 2008/0040274 A1 | 2/2008 | Uzo |
| 2008/0086767 A1 | 4/2008 | Kulkarni et al. |
| 2008/0140522 A1 | 6/2008 | Tutone |
| 2008/0154654 A1 | 6/2008 | Niessen et al. |
| 2008/0154765 A1 * | 6/2008 | Wolfe .............................. 705/37 |
| 2008/0154847 A1 | 6/2008 | Chellapilla et al. |
| 2008/0167991 A1 | 7/2008 | Carlson et al. |
| 2008/0183576 A1 | 7/2008 | Kim et al. |
| 2008/0183675 A1 | 7/2008 | Schwarz et al. |
| 2008/0201226 A1 | 8/2008 | Carlson et al. |
| 2008/0208739 A1 | 8/2008 | Phillips |
| 2008/0215475 A1 | 9/2008 | Ramer et al. |
| 2008/0221997 A1 | 9/2008 | Wolfe |
| 2008/0228600 A1 | 9/2008 | Treyz et al. |
| 2008/0262928 A1 | 10/2008 | Michaelis |
| 2008/0268868 A1 | 10/2008 | Maitland |
| 2008/0275768 A1 | 11/2008 | Berman et al. |
| 2008/0281677 A1 | 11/2008 | Toms et al. |
| 2008/0281702 A1 | 11/2008 | Kirkwood |
| 2008/0318559 A1 | 12/2008 | Porco |
| 2009/0005973 A1 | 1/2009 | Salo et al. |
| 2009/0006203 A1 | 1/2009 | Fordyce, III et al. |
| 2009/0024477 A1 | 1/2009 | Kramer et al. |
| 2009/0024700 A1 | 1/2009 | Garg et al. |
| 2009/0030779 A1 | 1/2009 | Tollinger et al. |
| 2009/0061884 A1 | 3/2009 | Rajan et al. |
| 2009/0076896 A1 | 3/2009 | DeWitt et al. |
| 2009/0076925 A1 | 3/2009 | DeWitt et al. |
| 2009/0125380 A1 | 5/2009 | Otto et al. |
| 2009/0125396 A1 | 5/2009 | Otto et al. |
| 2009/0132417 A1 | 5/2009 | Scipioni et al. |
| 2009/0138302 A1 | 5/2009 | Breznik et al. |
| 2009/0143966 A1 | 6/2009 | Jacobson et al. |
| 2009/0150218 A1 | 6/2009 | Brunner et al. |
| 2009/0152343 A1 | 6/2009 | Carter et al. |
| 2009/0157547 A1 | 6/2009 | Ruckart |
| 2009/0187463 A1 | 7/2009 | DaCosta |
| 2009/0187466 A1 | 7/2009 | Carter et al. |
| 2009/0187488 A1 | 7/2009 | Shamilian |
| 2009/0187492 A1 | 7/2009 | Hammad et al. |
| 2009/0198607 A1 | 8/2009 | Badger et al. |
| 2009/0199107 A1 | 8/2009 | Lewis et al. |
| 2009/0216646 A1 | 8/2009 | Seven et al. |
| 2009/0222346 A1 | 9/2009 | Greene et al. |
| 2009/0228325 A1 | 9/2009 | Simmons et al. |
| 2009/0240582 A1 | 9/2009 | Sheldon-Neal et al. |
| 2009/0240622 A1 | 9/2009 | Zandonadi |
| 2009/0249497 A1 | 10/2009 | Fitzgerald et al. |
| 2009/0253408 A1 | 10/2009 | Fitzgerald et al. |
| 2009/0254930 A1 | 10/2009 | Lo et al. |
| 2009/0271275 A1 | 10/2009 | Regmi et al. |
| 2009/0281945 A1 | 11/2009 | Shakkarwar |
| 2009/0287558 A1 | 11/2009 | Seth et al. |
| 2009/0292642 A1 | 11/2009 | Han |
| 2009/0299857 A1 * | 12/2009 | Brubaker ................... 705/14.66 |
| 2009/0313129 A1 | 12/2009 | Rothschild |
| 2009/0327135 A1 | 12/2009 | Nguyen et al. |
| 2009/0327151 A1 | 12/2009 | Carlson et al. |
| 2010/0004997 A1 | 1/2010 | Mehta et al. |
| 2010/0006641 A1 | 1/2010 | Boutcher et al. |
| 2010/0006642 A1 | 1/2010 | Boutcher et al. |
| 2010/0030592 A1 | 2/2010 | Evans et al. |
| 2010/0030646 A1 * | 2/2010 | Riise et al. ................. 705/14.58 |
| 2010/0030651 A1 | 2/2010 | Matotek et al. |
| 2010/0032339 A1 | 2/2010 | Hasegawa et al. |
| 2010/0041419 A1 | 2/2010 | Svendsen et al. |
| 2010/0042421 A1 | 2/2010 | Bai et al. |
| 2010/0049615 A1 | 2/2010 | Rose et al. |
| 2010/0057530 A1 | 3/2010 | Parivash et al. |
| 2010/0063891 A1 | 3/2010 | Townsend et al. |
| 2010/0070334 A1 | 3/2010 | Monteverde |
| 2010/0070365 A1 | 3/2010 | Siotia et al. |
| 2010/0076829 A1 | 3/2010 | Bishop |
| 2010/0076849 A1 | 3/2010 | Bishop |
| 2010/0077036 A1 | 3/2010 | DeLuca et al. |
| 2010/0082420 A1 | 4/2010 | Trifiletti et al. |
| 2010/0082445 A1 | 4/2010 | Hodge et al. |
| 2010/0088188 A1 | 4/2010 | Kumar et al. |
| 2010/0100454 A1 | 4/2010 | Sines et al. |
| 2010/0106611 A1 | 4/2010 | Paulsen et al. |
| 2010/0114775 A1 | 5/2010 | Griffin |

(56) References Cited

U.S. PATENT DOCUMENTS

| | | |
|---|---|---|
| 2010/0121717 A1 | 5/2010 | Chen |
| 2010/0138294 A1 | 6/2010 | Bussmann et al. |
| 2010/0138344 A1 | 6/2010 | Wong et al. |
| 2010/0145723 A1 | 6/2010 | Hudson et al. |
| 2010/0145778 A1 | 6/2010 | Fordyce, III et al. |
| 2010/0146607 A1 | 6/2010 | Piepenbrink et al. |
| 2010/0156933 A1 | 6/2010 | Jones et al. |
| 2010/0169179 A1 | 7/2010 | Ramer et al. |
| 2010/0185504 A1 | 7/2010 | Rajan et al. |
| 2010/0190510 A1 | 7/2010 | Maranhas et al. |
| 2010/0191551 A1 | 7/2010 | Drance et al. |
| 2010/0191578 A1 | 7/2010 | Tran et al. |
| 2010/0192230 A1 | 7/2010 | Steeves et al. |
| 2010/0205167 A1 | 8/2010 | Tunstall-Pedoe et al. |
| 2010/0217525 A1 | 8/2010 | King et al. |
| 2010/0223184 A1 | 9/2010 | Perlman |
| 2010/0241495 A1 | 9/2010 | Maniyar et al. |
| 2010/0241496 A1 | 9/2010 | Gupta et al. |
| 2010/0250368 A1 | 9/2010 | Porco |
| 2010/0257054 A1 | 10/2010 | Martin et al. |
| 2010/0260388 A1 | 10/2010 | Garrett et al. |
| 2010/0262449 A1 | 10/2010 | Monteforte et al. |
| 2010/0274655 A1 | 10/2010 | Postrel |
| 2010/0293065 A1 | 11/2010 | Brody |
| 2010/0306099 A1 | 12/2010 | Hirson et al. |
| 2010/0312630 A1 | 12/2010 | Krutchik et al. |
| 2010/0312645 A1 | 12/2010 | Niejadlik et al. |
| 2010/0312646 A1 | 12/2010 | Gupta et al. |
| 2010/0323716 A1 | 12/2010 | Jaffri |
| 2010/0324977 A1 | 12/2010 | Dragt |
| 2010/0332339 A1 | 12/2010 | Patel et al. |
| 2011/0010238 A1 | 1/2011 | Postrel |
| 2011/0015987 A1 | 1/2011 | Chakraborty et al. |
| 2011/0022424 A1 | 1/2011 | VonDerheide |
| 2011/0022483 A1 | 1/2011 | Hammad |
| 2011/0022517 A1 | 1/2011 | Hammad |
| 2011/0029403 A1 | 2/2011 | Xu |
| 2011/0053559 A1 | 3/2011 | Klein |
| 2011/0055005 A1 | 3/2011 | Lang |
| 2011/0057027 A1 | 3/2011 | Grossman et al. |
| 2011/0060640 A1 | 3/2011 | Thompson et al. |
| 2011/0065419 A1 | 3/2011 | Book et al. |
| 2011/0082735 A1 | 4/2011 | Kannan et al. |
| 2011/0087430 A1 | 4/2011 | Boss et al. |
| 2011/0093318 A1 | 4/2011 | Guday et al. |
| 2011/0106613 A1 | 5/2011 | Felt et al. |
| 2011/0112892 A1 | 5/2011 | Tarantino |
| 2011/0131627 A1 | 6/2011 | Abendroth et al. |
| 2011/0137804 A1 | 6/2011 | Peterson |
| 2011/0140841 A1 | 6/2011 | Bona et al. |
| 2011/0184793 A1 | 7/2011 | Bohannon et al. |
| 2011/0189981 A1 | 8/2011 | Faith et al. |
| 2011/0191152 A1 | 8/2011 | Schwartz |
| 2011/0191161 A1 | 8/2011 | Dai |
| 2011/0191237 A1 | 8/2011 | Faith et al. |
| 2011/0202416 A1 | 8/2011 | Buer et al. |
| 2011/0238474 A1 | 9/2011 | Carr et al. |
| 2011/0238476 A1 | 9/2011 | Carr et al. |
| 2011/0238514 A1 | 9/2011 | Ramalingam et al. |
| 2011/0238517 A1 | 9/2011 | Ramalingam et al. |
| 2011/0270618 A1 | 11/2011 | Banerjee et al. |
| 2011/0289004 A1 | 11/2011 | Prakash et al. |
| 2011/0302016 A1 | 12/2011 | Haddad |
| 2012/0010931 A1 | 1/2012 | Mehra et al. |
| 2012/0010938 A1 | 1/2012 | Standley et al. |
| 2012/0185317 A1 | 7/2012 | Wong |
| 2012/0259722 A1 | 10/2012 | Mikurak |
| 2012/0323703 A1 | 12/2012 | Hillier |
| 2014/0300540 A1 | 10/2014 | Beadle et al. |

FOREIGN PATENT DOCUMENTS

| | | |
|---|---|---|
| JP | 2000134147 | 5/2000 |
| JP | 2001222593 A | 8/2001 |
| JP | 2001357337 A | 12/2001 |
| JP | 2002099971 | 4/2002 |
| JP | 2002175354 A | 6/2002 |
| JP | 2002288502 A | 10/2002 |
| JP | 2003022481 A | 1/2003 |
| JP | 2003090730 | 3/2003 |
| JP | 2004-264986 A | 9/2004 |
| JP | 2004341684 A | 12/2004 |
| JP | 2006164189 | 6/2006 |
| JP | 2007208444 | 8/2007 |
| JP | 2007522564 | 8/2007 |
| JP | 2008022395 | 1/2008 |
| JP | 2008199221 | 8/2008 |
| JP | 2009020036 | 1/2009 |
| JP | 2009205684 | 9/2009 |
| JP | 2009-538093 A | 10/2009 |
| JP | 2009224868 | 10/2009 |
| JP | 2009-283989 A | 12/2009 |
| JP | 2009282618 | 12/2009 |
| JP | 2011188256 | 9/2011 |
| JP | 2012510681 | 5/2012 |
| JP | 2012529085 | 11/2012 |
| KR | 1020070105106 | 10/2007 |
| KR | 20090080000 A | 7/2009 |
| KR | 20090104068 | 10/2009 |
| WO | 2008067543 | 6/2008 |
| WO | 2010015995 | 2/2010 |
| WO | WO2010065235 | 6/2010 |
| WO | WO2010138891 | 12/2010 |

OTHER PUBLICATIONS

The PCT Search Report for PCT application No. PCT/US12/29798 dated Jul. 5, 2012, 7 pages.

Office action for U.S. Appl. No. 13/052,930, dated Jul. 8, 2013, Hart et al., "Advertisement Service", 20 pages.

U.S. Appl. No. 13/052,930, filed Mar. 21, 2011, Hart et al., "Advertisement Service".

U.S. Appl. No. 13/052,930, filed Mar. 21, 2011, Hart et al., "Advertisement Service" 54 Pages.

Definition: Purchase, retrieved on Mar. 31, 2014 at <<dictionary.reference.com/browse/purchase?s=t>>, World English Dictionary, 2009, 2 pages.

The Extended European Search Report dated Feb. 26, 2014 for European patent application No. 11759940.7, 11 pages.

Office Action from U.S. Appl. No. 12/894,287, dated Mar. 27, 2014, Michael Carr, "Location-based Coupons and Mobile Devices", 17 pages.

Final Office Action for U.S. Appl. No. 12/820,743, dated Apr. 10, 2014, Harsha Ramalingam, "Hierarchical Device Relationships for Geolocation-Based Transactions", 24 pages.

Office Action for U.S. Appl. No. 12/820,705, dated Apr. 2, 2014, Harsha Ramalingam, "Transaction Completion Based on Geolocation Arrival", 11 pages.

Final Office Action for U.S. Appl. No. 12/820,913, dated Apr. 9, 2014, Harsha Ramalingam, "Transaction Bootstrapping to Create Relationships", 21 pages.

Translated Japanese Office Action dated Dec. 10, 2013 for Japanese patent application No. 2013-500205, a counterpart foreign application of U.S. Pat. No. 8,140,403, 9 pages.

"MGM Grand, MacroView Labs—Mobile App Developers for iPhone, Android, Blackberries", retrieved on Jan. 13, 2011 at <<http://www.macroviewlabs.com/mgmgrand>>, 5 pages.

Office action for U.S. Appl. No. 12/820,949, dated Nov. 9, 2012, Ramalingam et al, "Transaction Tracking and Incentives", 11 pages.

Office action for U.S. Appl. No. 12/894,323, dated Dec. 12, 2012, Carr et al., "Converged Web-identity and Mobile Device Based Shopping", 9 pages.

Office Action for U.S. Appl. No. 13/052,930, dated Dec. 16, 2013, Gregory M. Hart, "Advertisement Service", 28 pages.

Office action for U.S. Appl. No. 12/820,743, dated Dec. 27, 2013, Ramalingam et al., "Hierarchical Device Relationships for Geolocation-Based Transactions", 26 pages.

Non-Final Office Action for U.S. Appl. No. 12/820,816, dated Dec. 31, 2012, Harsha Ramalingham et al., "Mobile Device Security", 10 pages.

(56) References Cited

OTHER PUBLICATIONS

Office Action for U.S. Appl. No. 12/820,913, dated Dec. 4, 2013, Harsha Ramalingam, "Transaction Bootstrapping to Create Relationships", 24 pages.
Non-Final Office Action for U.S. Appl. No. 12/894,287, dated Dec. 5, 2012, Michael Carr et al., "Location-based Coupons and Mobile Devices", 8 pages.
Non-Final Office Action for U.S. Appl. No. 12/820,705, dated Feb. 27, 2012, Harsha Ramalingam et al., "Transaction Completion Based on Geolocation Arrival", 15 pages.
Non-Final Office Aciotn for U.S. Appl. No. 12/820,743, dated Feb. 27, 2012, Harsha Ramalingam et al, "Hierarchical Device Relationships for Geolocation-Based Transactions", 18 pages.
U.S. Appl. No. 12/820,816, filed Jun. 22, 2010, Harsha Ramalingam, "Mobile Device Security".
U.S. Appl. No. 12/976,533, filed Dec. 22, 2010, Harsha Ramalingam, "Mobile Payments Using Point-of-sale Infrastructure".
U.S. Appl. No. 13/027,913, filed Feb. 15, 2011, Harsha Ramalingam, et al., "User Profile and Geolocation for Efficient Transactions".
U.S. Appl. No. 13/371,038, filed Feb. 10, 2012, Harsha Ramalingam et al., "User Profile and Geolocation for Efficient Transactions ".
Alqerem et al., "Location Dependent Transaction for Mobile Environment", International Conference on Information and Communication Technologies: From Theory to Applications, Piscataway, NJ, 2006, 2 pages.
Collins, "Smartphones to be used as Hotel Room Keys", Telegraph Media Group Limited, May 25, 2010, Retrieved on Jun. 2, 2010 at <<http://www.telegraph.co.uk/travel/hotels/7762522/Smartphones-to-be-used-as-hotel-room-keys.html pp. 1-2.
Deleon, "Holiday Inn to Trial Mobile-as-room-key Program Next Month", TechCrunch, May 25, 2010, Retrieved on Jun. 2, 2010 at <<http://www.mobilecrunch.com/2010/05/25/holiday-inn-to-trial-mobile-as-room-key-program-next-month/>> 1 pg.
Dictionary.com, "Broadcast", retrived at <<http://dictionary.reference.com/browse/broadcast>> on Feb. 6, 2012, 4 pages.
Final Office Action for U.S. Appl. No. 12/820,949, dated Jan. 6, 2014, Harsha Ramalingam, "Transaction Tracking and Incentives", 22 pages.
Final Office Action for U.S. Appl. No. 12/820,854, dated Oct. 22, 2013, Harsha Ramalingam, "Location-Based Marketing to Mobile Devices", 21 pages.
Final Office Action for U.S. Appl. No. 12/820,705, dated Dec. 5, 2013, Harsha Ramalingam, "Transaction Completion Based on Geolocation Arrival", 14 pages.
Office action for U.S. Appl. No. 12/820,913, dated Feb. 8, 2013, Ramalingam et al., "Transaction Bootstrapping to Create Relationships", 19 pages.
Office action for U.S. Appl. No. 12/820,854, dated Apr. 10, 2013, Ramalingam et al., "Location-Based Marketing to Mobile Devices", 22 pages.
Office action for U.S. Appl. No. 13/468,714, dated Apr. 11, 2013, Ramalingam, "Mobile Payments Using Point-of sale Infrastructure", 35 pages.
Office action for U.S. Appl. No. 12/976,533, dated Apr. 12, 2013, Ramalingam, "Mobile Payments Using Point-of sale Infrastructure", 44 pages.
Office action for U.S. Appl. No. 12/820,949, dated Jun. 20, 2013, Ramalingam et al, "Transaction Tracking and Incentives", 20 pages.
Final Office Aciotn for U.S. Appl. No. 12/820,743, dated Jun. 21, 2012, Harsha Ramalingam et al, "Hierarchical Device Relationships for Geolocation-Based Transactions", 24 pages.
Office action for U.S. Appl. No. 12/894,323, dated Jun. 24, 2013, Carr et al., "Converged Web-identity and Mobile Device Based Shopping", 12 pages.
Office action for U.S. Appl. No. 12/820,705, dated Jul. 12, 2013, Ramalingam et al, "Transaction Based Completion on Geolocation Arrival", 16 pages.

Office action for U.S. Appl. No. 12/894,287, dated Jul. 16, 2013, Carr et al., "Location-based Coupons and Mobile Devices", 18 pages.
Non-Final Office Action for U.S. Appl. No. 13/371,038, dated Jul. 23, 2012, Harsha Ramalingam et al., 8 pages.
Final Office Action for U.S. Appl. No. 12/820,705, dated Jul. 25, 2012, Harsha Ramalingam et al., "Transaction Completion Based on Geolocation Arrival", 16 pages.
Non-Final Office Action for U.S. Appl. No. 12/820,854, dated Jul. 27, 2012, Harsha Ramalingam et al., "Location-Based Marketing to Mobile Devices", 16 pages.
Non-Final Office Action for U.S. Appl. No. 12/820,913, dated Jul. 31, 2012, Harsha Ramalingam et al. "Transaction Bootstrapping to Create Relationships", 14 pages.
Non-Final Office Action for U.S. Appl. No. 13/468,714, dated Aug. 16, 2012, Harsha Ramalingam, "Mobile Payments Using Point-of-sale Infrastructure", 29 pages.
Non-Final Office Action for U.S. Appl. No. 12/976,533, dated Aug. 16, 2012, Harsha Ramalingam, "Mobile Payments Using Point-of-sale Infrastructure", 38 pages.
The PCT Search Report dated May 12, 2011 for PCT Application No. PCT/US11/28825.
"Placecast Raises $3 Million for Location-Based Mobile Marketing Technology", The Good NET Guide, Retrieved on Mar. 25, 2010 at <<http://thegoodnetguide.com/03/placecast-raises-3-million-for-location-based-mobile-marketing-technology/>>, 1 pg.
Prabhu, "Transaction Processing in Mobile Database System", University of Missouri—Kansas City, 2006. vol. 67/12-B of Dissertation Abstracts International, 1 page.
Starbucks Card Mobile App, "Using Your Starbucks Card is Now Even Faster and Easier With the Starbucks Card Mobile App", Retrieved on Apr. 22, 2010 at <<http://www.starbucks.com/coffeehouse/mobile-apps/starbucks-card-mobile>>, pp. 1-2.
WebWire, "BooksOnBoard Adds Google Checkout, Offers Discount on Google Checkout Purchases", Jun. 11, 2008, retrived from Google News Apr. 6, 2012, pp. 1-pp. 2.
The Extended European Search Report dated Oct. 31, 2014 for European Patent Application No. 12760316.5, 7 pages.
Translated Korean Office Action dated Oct. 17, 2014 for Korean patent application No. 10-2012-7024786, a counterpart foreign application of U.S. Appl. No. 12/820,672, 11 pages.
Office Action for U.S. Appl. No. 12/820,854, dated Nov. 5, 2014, Harsha Ramalingam, "Location-Based Marketing to Mobile Devices" , 23 pages.
Office Action for U.S. Appl. No. 12/894,287, dated Dec. 4, 2014, Michael Carr, "Location-based Coupons and Mobile Devices", 24 pages.
Chinese Office Action dated Mar. 10, 2015 for Chinese patent application No. 2011800155793, a counterpart foreign application of U.S. Appl. No. 12/820,672, 11 pages.
Translated Korean Office Action dated Jan. 28, 2015 for Korean patent application No. 10-2014-7035474, a counterpart foreign application of U.S. Appl. No. 12/820,672, 11 pages.
Canadian Office Action dated Aug. 29, 2014 for Canadian patent application No. 2794085, a counterpart foreign application of U.S. Appl. No. 12/820,672, 3 pages.
U.S. Appl. No. 12/820,672 , "Non-Final Office Action", dated Mar. 24, 2011, 24 pages.
U.S. Appl. No. 12/820,672 , "Notice of Allowance", dated Nov. 7, 2011, 10 pages.
U.S. Appl. No. 12/820,672 , "Restriction Requirement", dated Jan. 27, 2011, 9 pages.
U.S. Appl. No. 12/820,705 , "Final Office Action", dated Aug. 19, 2015, 15 pages.
U.S. Appl. No. 12/820,705 , "Final Office Action", dated Jun. 17, 2016, 15 pages.
U.S. Appl. No. 12/820,705 , "Restriction Requirement", dated Feb. 11, 2015, 7 pages.
U.S. Appl. No. 12/820,705 , "Restriction Requirement", dated Nov. 22, 2011, 8 pages.
U.S. Appl. No. 12/820,743 , "Advisory Action", dated Oct. 7, 2015.
U.S. Appl. No. 12/820,743 , "Restriction Requirement", dated Jan. 7, 2015.

(56) References Cited

OTHER PUBLICATIONS

U.S. Appl. No. 12/820,743, "Restriction Requirement", dated Nov. 18, 2011.
U.S. Appl. No. 12/820,743, "Final Office Action", dated Jun. 29, 2016.
U.S. Appl. No. 12/820,854, "Non-Final Office Action", dated May 24, 2016, 19 pages.
U.S. Appl. No. 12/820,913, "Advisory Action", dated May 8, 2013.
U.S. Appl. No. 12/820,913, "Non-Final Office Action", dated Sep. 9, 2015, 30 pages.
U.S. Appl. No. 12/820,949, "Advisory Action", dated Apr. 16, 2014.
U.S. Appl. No. 12/820,949, "Restriction Requirement", dated Jul. 31, 2012.
U.S. Appl. No. 12/820,949, "Transaction Tracking and Incentives", U.S. Appl. No., filed Jun. 22, 2010.
U.S. Appl. No. 12/894,287, "Advisory Action", dated Dec. 19, 2013, 3 pages.
U.S. Appl. No. 12/894,287, "Non-Final Office Action", dated Sep. 3, 2015, 24 pages.
U.S. Appl. No. 12/894,287, "Restriction Requirement", dated Sep. 25, 2012, 7 pages.
U.S. Appl. No. 12/894,323, "Notice of Allowance", dated Feb. 2, 2015, 14 pages.
U.S. Appl. No. 12/894,323, "Restriction Requirement", dated Sep. 25, 2012, 7 pages.
U.S. Appl. No. 12/976,533, "Final Office Action", dated Jun. 3, 2016, 51 pages.
U.S. Appl. No. 12/976,533, "Non-Final Office Action", dated Sep. 23, 2015, 39 pages.
U.S. Appl. No. 13/027,913, "Non-Final Office Action", dated Mar. 29, 2011, 25 pages.
U.S. Appl. No. 13/027,913, "Notice of Allowance", dated Nov. 7, 2011, 21 pages.
U.S. Appl. No. 13/371,038, "Notice of Allowance", dated Oct. 11, 2012, 9 pages.
U.S. Appl. No. 13/371,038, "Restriction Requirement", dated Apr. 6, 2012, 7 pages.
U.S. Appl. No. 13/468,714, "Non-Final Office Action", dated Aug. 31, 2015, 36 pages.
U.S. Appl. No. 13/725,466, "Non-Final Office Action", dated Oct. 5, 2015, 20 pages.
U.S. Appl. No. 13/973,870, "Corrected Notice of Allowability", dated May 20, 2015, 7 pages.
U.S. Appl. No. 13/973,870, "Notice of Allowance", dated Apr. 3, 2015, 11 pages.
U.S. Appl. No. 14/726,380, "Final Office Action", dated Apr. 15, 2016, 36 pages.
U.S. Appl. No. 14/726,380, "Restriction Requirement", dated Dec. 9, 2015, 7 pages.
U.S. Appl. No. 14/821,337, "Corrected Notice of Allowability", dated Apr. 11, 2016.
U.S. Appl. No. 14/821,337, "Corrected Notice of Allowability", dated Mar. 22, 2016.
U.S. Appl. No. 14/821,337, "Corrected Notice of Allowability", dated May 2, 2016.
CA2,794,085, "Office Action", dated Aug. 27, 2015, 4 pages.
CA2,830,268, "Office Action", dated Mar. 30, 2016, 5 pages.
CN201180015579.3, "Office Action", dated Oct. 16, 2015, 13 pages.
JP2015-047434, "Notice of Allowance", dated Dec. 15, 2015, 6 pages.
KR10-2014-7035474, "Office Action", dated Oct. 29, 2015, 3 pages.
U.S. Appl. No. 12/820,705, "Non-Final Office Action", dated Feb. 9, 2016, 13 pages.
U.S. Appl. No. 12/820,743, "Non-Final Office Action", dated Feb. 1, 2016, 9 pages.
U.S. Appl. No. 12/820,913, "Final Office Action", dated Mar. 4, 2016, 42 pages.
U.S. Appl. No. 12/894,287, "Final Office Action", dated Feb. 22, 2016, 29 pages.
U.S. Appl. No. 13/468,714, "Final Office Action", dated Feb. 25, 2016, 12 pages.
U.S. Appl. No. 13/725,466, "Final Office Action", dated Mar. 16, 2016, 28 pages.
U.S. Appl. No. 14/821,337, "Notice of Allowance", dated Mar. 11, 2016, 9 pages.
KR10-2015-7033998, "Office Action", dated Jan. 6, 2016, 6 pages.
U.S. Appl. No. 13/052,930, "Final Office Action", dated Feb. 2, 2016, 35 pages.
CN201280008527.8, "Office Action", Dec. 24, 2015, 15 pages.
U.S. Appl. No. 12/820,705, "Notice of Allowance", dated Dec. 16, 2016, 7 pages.
U.S. Appl. No. 12/820,913, "Examiner's Answer to Appeal Brief", dated Feb. 24, 2017, 54 pages.
U.S. Appl. No. 12/894,287, "Final Office Action", dated Feb. 3, 2017, 24 pages.
U.S. Appl. No. 13/468,714, "Notice of Allowance", dated Feb. 28, 2017, 9 pages.
U.S. Appl. No. 14/726,380, "Final Office Action", dated Feb. 2, 2017, 47 pages.
CA2,830,268, "Office Action", dated Feb. 1, 2017, 14 pages.
CA2,921,085, "Office Action", dated Feb. 9, 2017, 3 pages.
CN201280008527.8, "Office Action", dated Jan. 24, 2017, 16 pages.
U.S. Appl. No. 12/820,705, "Advisory Action", dated Sep. 27, 2016, 3 pages.
U.S. Appl. No. 12/820,854, "Final Office Action", dated Aug. 31, 2016, 21 pages.
U.S. Appl. No. 12/820,913, "Non-Final Office Action", dated Jul. 22, 2016, 19 pages.
U.S. Appl. No. 12/894,287, "Non-Final Office Action", dated Jul. 29, 2016, 38 pages.
U.S. Appl. No. 14/726,380, "Non-Final Office Action", dated Aug. 9, 2016, 43 pages.
CA2,794,085, "Office Action", dated Sep. 15, 2016, 3 pages.
CN201180015579.3. "Decision to Grant", dated Sep. 1, 2016, 2 pages.
CN201280008527.8, "Office Action", dated Aug. 4, 2016, 15 pages.
EP11759940.7, "Office Action", dated Aug. 17, 2016, 6 pages.
EP12760316.5, "Office Action", dated Aug. 9, 2016, 6 pages.
KR10-2015-07033998, "Office Action", dated Jul. 26, 2016, 7 pages.
U.S. Appl. No. 13/052,930, "Final Office Action", dated Jul. 18, 2017, 39 pages.
U.S. Appl. No. 13/725,466, "Final Office Action", dated Aug. 4, 2017, 22 pages.
CA2,794,085, "Office Action", dated Aug. 14, 2017, 3 pages.
CA2,830,268, "Office Action", dated Sep. 20, 2017, 7 pages.
CN201280008527.8, "Office Action", dated Aug. 22, 2017, 9 pages.
EP17158535.9, "Extended European Search Report", dated Jul. 11, 2017, 7 pages.
Final Office Action for U.S. Appl. No. 12/820,913, dated Apr. 24, 2015, Harsha Ramalingam, "Transaction Bootstrapping to Create Relationships", 12 pages.
Final Office Action for U.S. Appl. No. 12/820,854, dated Jun. 3, 2015, Harsha Ramalingam, "Location-Based Marketing to Mobile Devices", 11 pages.
Office Action for U.S. Appl. No. 13/052,930, dated Jul. 10, 2015, Gregory M. Hart, "Advertisement Service", 30 pages.
Office action for U.S. Appl. No. 14/726,380, dated Jul. 22, 2015, Carr et al., "Converged Web-Identity and Mobile Device Based Shopping", 12 pages.
Office action for U.S. Appl. No. 12/820,743, dated Jul. 29, 2015, Ramalingam et al., "Hierarchical Device Relationships for Geolocation-Based Transactions", 9 pages.
U.S. Appl. No. 12/820,743, "Notice of Allowance", dated Apr. 12, 2017, 9 pages.
U.S. Appl. No. 12/820,949, "Notice of Allowance", dated May 23, 2017, 22 pages.

(56) References Cited

OTHER PUBLICATIONS

U.S. Appl. No. 13/725,466 , "Non-Final Office Action", dated Mar. 20, 2017, 29 pages.

KR10-2017-7002603 , "Office Action", dated Mar. 7, 2017, 6 pages.

The Canadian Office Action dated Apr. 7, 2015 for Canadian patent application No. a counterpart foreign application of U.S. Appl. No. 13/052,930, 5 pages.

Translated Japanese Office Action dated Mar. 31, 2015 for Japanese patent application No. 2015-047434, a counterpart foreign application of U.S. Appl. No. 12/820,672, 9 pages.

Translated Korean Office Action dated Apr. 24, 2015 for Korean patent application No. 10-2012-7024786, a counterpart foreign application of U.S. Appl. No. 12/820,672, 9 pages.

Office Action for U.S. Appl. No. 12/820,705, dated Apr. 17, 2015, Harsha Ramalingam, "Transaction Completion Based on Geolocation Arrival", 23 pages.

Office action for U.S. Appl. No. 12/820,743, dated Apr. 3, 2015, Ramalingam et al., "Hierarchical Device Relationships for Geolocation-Based Transactions", 21 pages.

Final Office Action for U.S. Appl. No. 12/894,287, dated Apr. 9, 2015, Michael Carr, "Location-based Coupons and Mobile Devices", 24 pages.

Translated Japanese Office Action dated Jul. 1, 2014 for Japanese patent application No. 2014-094659, a counterpart foreign application of U.S. Pat. No. 8,140,403, 4 pages.

Translated Japanese Office Action dated Jul. 29, 2014 for Japanese patent application No. 2013-553675, a counterpart foreign application of U.S. Appl. No. 13/052,930, 9 pages.

Office Action for U.S. Appl. No. 12/820,854, dated May 9, 2014, Harsha Ramalingam, "Location-Based Marketing to Mobile Devices", 25 pages.

Office action for U.S. Appl. No. 13/052,930, dated Jul. 1, 2014, Hart et al., "Advertisement Service", 29 pages.

Office action for U.S. Appl. No. 12/820,913, dated Sep. 11, 2014, Ramalingam et al., "Transaction Bootstrapping to Create Relationships", 15 pages.

Office action for U.S. Appl. No. 12/894,323, dated Sep. 11, 2014, Carr et al, "Converged Web-identity and Mobile Device Based Shopping", 14 pages.

Office action for U.S. Appl. No. 12/820,705, dated Sep. 2, 2014, Ramalingam et al., "Transaction Completion Based on Geolocation Arrival", 12 pages.

\* cited by examiner

LOCATION-BASED MOBILE ADVERTISING

BACKGROUND

Advertising generally involves calling the attention of members of the public to products and services being offered for sale. Advertising has become a highly competitive endeavor with numerous advertisers typically competing for market share in many market segments. Consequently, new or distinctive techniques for providing advertisements to members of the public can provide a competitive advantage to an advertiser.

Additionally, coupons have been in use for many years as a form of advertisement that offers an incentive to get a potential customer to try a product or service, such as by offering the product or service at a discounted price. Further, in some cases, coupons or other advertisements can be provided to a consumer's mobile device, such as through email or by downloading from a website. Examples of such mobile devices may include smart phones, cellular telephones, personal digital assistants (PDAs), portable media players, electronic book readers, laptops, tablet computers, netbooks and so forth. For instance, consumers may use mobile devices for shopping online and may also utilize a coupon while shopping online. Further, consumers may utilize a coupon on a mobile device when making a purchase in-person, such as by using the mobile device to display an image of the coupon to a cashier.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Proximity-Based Advertising

Figure 1:
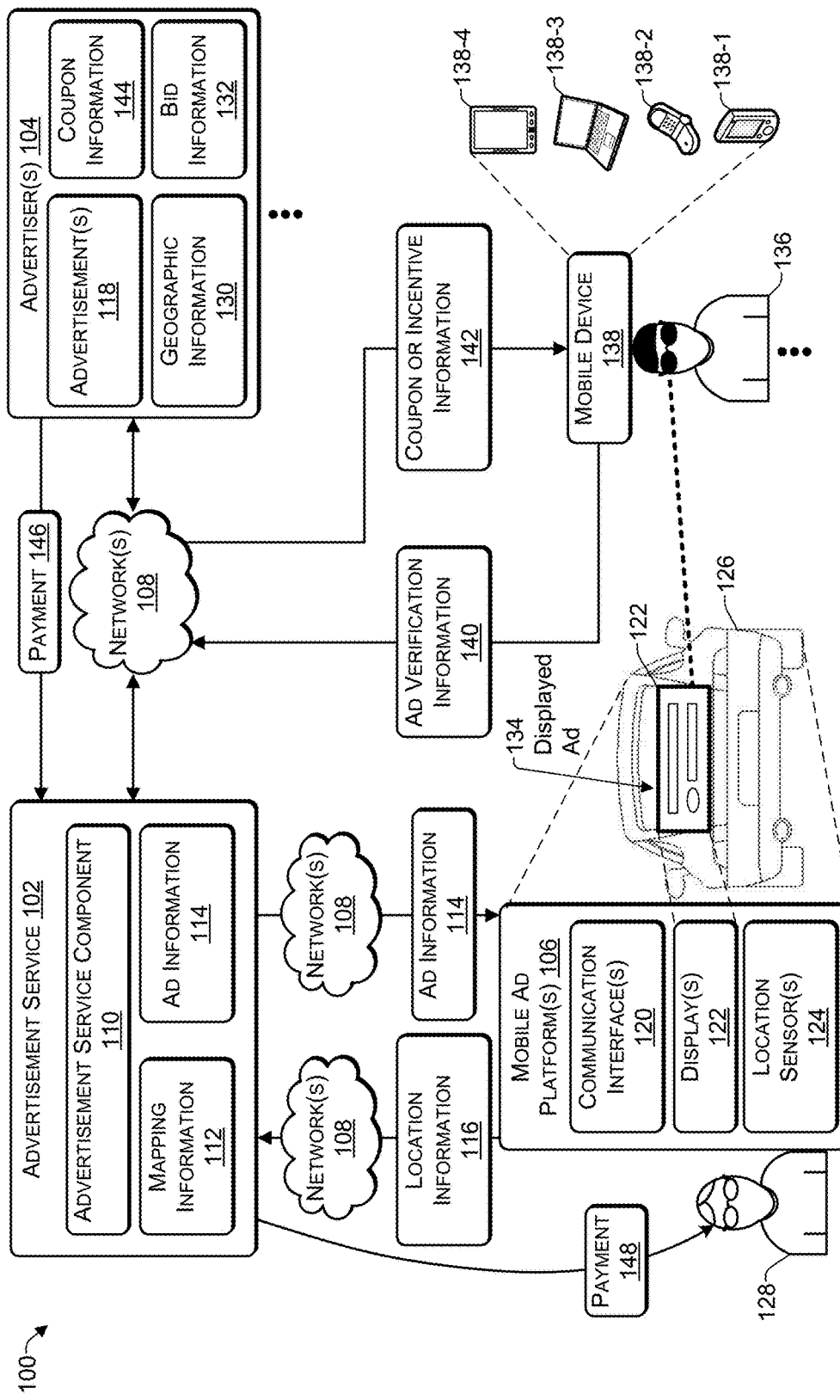
FIG. 1 illustrates an example architecture in which an advertisement service provides ads for display by a mobile ad platform based on proximity to a geographic region.

This disclosure includes techniques and arrangements for enabling advertisers to display ad content on a mobile advertising platform when the mobile ad platform is located within a particular geographic region that is of interest to the advertiser. For example, in some implementations, when the mobile ad platform is within a predetermined proximity to the advertiser's business, the mobile advertising platform may be configured to display the advertiser's advertisement. When the mobile ad platform leaves the predetermined proximity, the mobile advertising platform may display a different advertisement for a different advertiser. In some implementations, the mobile advertising platform may be located on or mounted on a vehicle such as a private automobile, a bus, a taxicab, a truck, or the like. Additionally, in some implementations, the mobile advertising platform may offer a coupon or other time-based incentive that causes a consumer to visit the advertiser's nearby business.

Some implementations provide a dynamic and mobile advertising platform. For example, an advertiser may provide an incentive for a person or business to place a mobile ad platform on their vehicle. In some instances, the mobile ad platform may include a transportable and publicly visible display, one or more location sensors, such as a global positioning system (GPS) device, and a communication interface for communicating with an advertisement service. For example, the display may be placed on the side of the vehicle, on the rear of the vehicle, on the roof of the vehicle, in a side or rear window of the vehicle, or the like. In some implementations, the display may be publicly visible while the vehicle is moving while in other implementations, the display may be made publicly visible after the vehicle is parked. Members of the general public within eyesight of the publicly visible display are able to view advertisements, coupons and other incentive offers displayed on the publicly visible display, and may respond or otherwise take advantage of the information displayed on the publicly visible display. For example, because the display is publicly visible in a public location, multiple different consumers or other third parties having no association or affiliation with the display, the mobile ad platform, or the advertisement service are able to view the advertisements and respond thereto.

The mobile ad platform may be powered by a dedicated battery or by the vehicle's electrical system. Additionally, the mobile ad platform may use the one or more location sensors to detect the current location of the vehicle and report the current location to a remotely located advertisement service. Based on this information, the advertisement service may determine a suitable advertisement to place on the display. For example, as the vehicle comes within a predetermined proximity to a location of a first business, such as a restaurant, the display may display an advertisement for the restaurant. In some implementations, the mobile ad platform may wait until the vehicle is parked before displaying the advertisement. In other implementations, the advertisement may be displayed as the vehicle is moving. In some instances, the direction of travel of the vehicle may also be determined so that a next ad to be displayed can be anticipated and/or the content of a current ad may be changed dynamically in real time or near real time.

In some implementations, the content of the displayed advertisement may be based on the location determined for the vehicle. For example, if the restaurant is ½ block ahead and around the corner to the right from the vehicle, the advertisement may display an arrow that points forward and to the right in the direction of the restaurant. When the vehicle moves to a second location relative to the restaurant, the arrow may change. For example, when the vehicle is at a cross street that the restaurant is on, the arrow in the ad may change to point to the right. When the vehicle is at a location that is past the cross street, the arrow may change again to point to the rear and to the right. Numerous other variations are possible. For example, a map may be displayed that shows the restaurant location relative to a current location, and the map may change as the vehicle location changes. In yet other implementations, written directions may be provided with the advertisement, and these written directions are changed as the vehicle location changes. For instance, in the example given above, the ad may initially display written directions such as "proceed straight ahead and take a right on Main Street." These written directions may subsequently change to "take a right on Main Street" and then to "turn around and go left on Main Street" as the vehicle moves from one location to the next.

In addition, the displayed advertisement may offer an incentive for consumers to visit the business or otherwise purchase the offered product or service. In some implementations, a short message service (SMS) number and/or a quick response (QR) bar code may be displayed in the advertisement. For example, in the case of an SMS number, a consumer may use their mobile device to send a message to the SMS number, and in response may receive a return SMS or multimedia message service (MMS) message that includes a code number, a coupon image or other offered incentive delivered to their mobile device that may be used for a discount at the advertised business. Similarly, in the case of a QR barcode displayed in the advertisement, the consumer may use their mobile device to take a picture of or otherwise scan the QR barcode to obtain a coupon or incentive offer provided to their mobile device. For example, the QR barcode may automatically direct a web browser on the consumer's mobile device to a webpage that provides the coupon or incentive.

Additionally, in some implementations, the advertisement may include a time-sensitive or time-based incentive for the consumer. For example, the advertisement may indicate that the offer is valid for only a limited time, and may display a clock that counts down the time remaining for the offer. Alternatively, only a limited number of coupons may be offered, and the advertisement may indicate how many coupons are left. For example, the advertisement may include a countdown that changes to display the number of coupons remaining as the coupons are obtained by various consumers that view the advertisement and dial the SMS number or access the QR barcode. When the number of coupons remaining hits zero, the display may either turn off, or display some other advertisement. In another variation, the amount of discount offered by a coupon may change as the coupons are obtained by various consumers. For example, the first five coupons may offer something for free, the next five coupons may offer a 50% discount, the next five coupons may offer a 25% discount, and so forth, and the coupons may be valid for only a short time, so that there is an urgency to obtain and use a coupon. Furthermore, in some implementations, the offered incentive may also be location-specific. For instance, the coupon or offered incentive may be valid only at the particular nearby location of the business identified in the displayed advertisement.

Additionally, the advertiser may change the advertisement in real time. For instance, in the example mentioned above, if the restaurant becomes too crowded, the restaurant owner may send a message to the advertisement service to terminate the advertisement early. Likewise, if the restaurant is not crowded enough, the advertiser may change the advertisement to offer a greater incentive, such as by increasing as discount offered by the coupons. Alternatively, the restaurant owner may choose to increase a geographic area covered by the advertisement, or the like.

In addition, the owner of the vehicle that serves as the mobile ad platform may receive a royalty, commission or other payment for displaying the advertisement. For example, the owner (i.e., the mobile ad platform participant) may receive a first amount for the display of the advertisement, and a second amount for each coupon downloaded, each access to the advertiser's website, or the like. The owner also may receive a payment or other compensation just for having the mobile advertising platform mounted on his or her vehicle.

On the backend, a website or other user interface provided by the advertisement service may enable potential advertisers to bid for the rights to advertise based on geographic locations. For example, an advertiser might purchase advertisements in a geographic region around its store, such as a quarter-mile radius, a half-mile radius, a one-mile radius, a quarter-mile block, etc. The highest bidder or multiple bidders may be awarded the right to display their ads on the mobile ad platforms. For example, a highest bidder's advertisement might be displayed first. When the maximum number of coupons has been reached for the highest bidder's advertisement, then the next highest bidder's advertisement may be displayed. For example, a first advertiser may submit a winning bid to pay $1 per impression over a period of time, such as up to a maximum of 10 impressions per hour. The first advertiser's ad is displayed on the mobile ad platform, and when the advertising service has determined that 10 impressions have been made, the mobile ad platform may change the displayed advertisement to the second-highest bidder's ad. For instance, suppose that the second-highest bidder had bid to pay $0.75 per impression for up to 15 impressions per hour. Thus, the second highest bidder's ad may be displayed for the remainder of the hour or until 15 impressions have been obtained, whichever comes first. At the end of the hour, the highest bidder's ad may again be displayed, or if the 15 impressions on the second highest bidder's ad occur before the hour is over, a third highest bidder's ad may be displayed, and so forth. Thus, the ads displayed in a particular geographic region may change in accordance with a timing or a plan that is bid-on or submitted by one or more advertisers. Furthermore, the advertisement service may provide information to both advertisers and/or other potential advertisers regarding the current rates or winning bid amounts for one or more geographic regions. Thus, the availability of particular geographic regions for bidding, current rate information, and the like may be provided to advertisers through a user interface, or may be pushed to advertisers, such as through emails or other electronic communications.

As yet another example, a first highest-bidder's advertisement is displayed on a first subset of mobile ad platforms, while a second highest-bidder's advertisement is displayed on a second subset of mobile ad platforms. Still alternatively, two or more advertisements from two or more highest-bidding advertisers may be displayed side-by side on the display, or one advertiser's advertisement may be displayed on a first display, while a second advertiser's advertisement is displayed on a second display. Additionally, while advertisers are able to purchase the rights to advertise in geographic locations physically near their own businesses, competitors could alternatively purchase the right to advertise in those locations. Furthermore, the techniques described above are not limited to being mounted on vehicles, and may be adapted to other mobile platforms, such as clothing, backpacks, and other portable articles, items or devices able to have a display mounted thereon for viewing by the public. Further, in the case of buses and taxicabs, the display may also be mounted inside of the vehicle for viewing by passengers of the buses or taxicabs.

An advertisement service may enable the techniques described above and may provide the mobile ad platforms for participation by vehicle owners. For example, the advertisement service may map advertisers to particular geographic regions selected by or bid-on by the advertisers. Thus, the advertisement service may enable one or more advertisers to compete to provide ad content to the mobile ad platforms at selected locations. Upon an advertiser submitting a winning bid to provide ad content to a mobile ad platform, the advertisement service may provide ad content from this advertiser to the mobile ad platform when the mobile ad platform is determined to be located in that particular geographic location. Alternatively, in some implementations, the advertisements may be provided to the mobile ad platform in advance, and may be selected and displayed by the mobile ad platform upon autonomous determination of a current location.

In some implementations, the advertisement service may employ one or more maps indicating geographic regions that are bid on or selected by one or more advertisers. For instance, an advertiser may submit a winning bid on a quarter mile radius around each geographic location at which this advertiser has a physical (e.g., brick-and-mortar) storefront or other business. The advertisement service may receive periodic communications from one or more mobile advertising platforms managed by the advertisement service. For example, whenever the GPS coordinates of a particular mobile advertising platform coincide with one of the mapped geographic regions, the advertisement service may send a communication to the mobile advertising platform instructing the mobile advertising platform to display an advertisement for the advertiser that has won the bid on that geographic region or otherwise purchased the rights to advertise in that region. As mentioned above, in some instances, the advertisement may be included in the communication, while in other instances the advertisement may be already stored at the mobile advertising platform or downloaded by the mobile ad platform from another source.

Further, certain advertisers may be interested in placing bids for the opportunity to display competitive advertisements in the vicinity of a competitor's physical location. For instance, a competitor of a restaurant may place a bid for a particular geographic location around the restaurant. When a mobile ad platform enters the particular geographic location, ad content of the competitor is displayed on the mobile advertising platform currently located within a predetermined proximity to the restaurant.

As another example, suppose that a consumer is going to a brick-and-mortar electronics store to shop for a flat-screen television. While pulling into a parking garage near the electronics store, the consumer may notice a mobile advertising platform on a parked vehicle that has an advertisement of an online retailer displayed. The advertisement may be for a flat-screen television at a price lower than that available in the electronics store. Thus, according to some implementations, an online competitor of the electronics store may purchase ad space in the proximity of the electronics store for advertising competing goods. Additionally, as mentioned above, the advertisement may include a limited time coupon or other incentive offer to add a sense of urgency to the consumer to encourage the consumer to make a purchase. Should the consumer obtain or utilize the coupon, the advertisement service may track this and reward the owner of the vehicle having the particular mobile ad platform mounted thereon, and the advertisement service may also receive payment from the advertiser for an agreed upon fee.

In some implementations, the advertisement service may automatically receive an indication that the mobile advertising platform is located within a geographic region that has been selected or bid on. For example, the mobile advertising platform may include an application or other functionality that periodically sends location information to the advertisement service without any action required of the advertisement service or the owner of the vehicle. In the event that mobile advertising platform enters a particular geographic region, the advertisement service may "push" an advertisement to the mobile advertising platform. Additionally, should the mobile ad platform be in a geographic location that does not include a bid submitted by any advertisers, then a default advertisement may be displayed.

Example Architecture

FIG. 1 illustrates an example architecture 100 for an advertisement service 102 according to some implementations. Advertisement service 102 is able to communicate with one or more advertisers 104 and one or more mobile ad platforms 106 through one or more networks 108. The networks 108 may be is representative of any one or combination of multiple different types of networks, such as the Internet, cable networks, cellular networks, wireless networks (e.g., Wi-Fi, cellular) and wired networks.

For example, the advertisement service 102 may include an advertisement service component 110 that performs and manages the various functions of the advertisement service 102. In some implementations, the advertisement service 102 designates one or more particular geographic regions to each advertiser 104 as part of mapping information 112. For example, mapping information 112 may include maps of various geographic regions that can be correlated with location information 116 received from a mobile ad platform 106. Based on the location information 116 received from the mobile ad platform 106, the advertisement service component 110 may use mapping information 112 to determine a location of the mobile ad platform 106 relative to respective geographic regions within which the advertisers 104 would like to advertise.

The advertisement service 102 may also include ad information 114, which may include one or more advertisements 118 received from the advertiser 104. The ad information 114 may also designate which advertisements 118 are to be displayed when one of the mobile ad platforms 106 enters a particular geographic region. The advertisements 118 may include one or more of multiple types of ad content such as text, static images, video, audio, or the like. In some implementations, the advertisements 118 may be obtained from a third party, such as an advertising company hired by the advertiser, and may actually be stored on an ad server of an ad company or the advertiser.

In the illustrated example, the mobile ad platform 106 includes one or more communication interfaces 120, one or more displays 122 and one or more location sensors 124.

The communication interfaces 120 may include various types of communication hardware and associated software to enable communication between the mobile ad platform 106 and the advertisement service 102, with non-limiting examples including cellular communication and Wi-Fi communication. In some implementations, the location sensors 124 may include a conventional global positioning system (GPS) transceiver that is capable of using the Global Positioning Satellite System to determine a current location of the mobile ad platform 106. However, in other implementations, other sensors may be used to determine location, such as signal strength of nearby cell towers or Wi-Fi access points, triangulation, etc. Furthermore, the display 122 may be any suitable type of transportable display of a size and configuration for the intended use capable of displaying ad content as described above. Additionally, in some implementations, one or more speakers (not shown in FIG. 1) may be included with the mobile ad platform 106 to provide audio accompaniment to a displayed advertisement.

In the illustrated example, the mobile ad platform 106 is mounted on a vehicle 126. In this case, the display 122 may be a liquid crystal display (LCD) or other suitable display type that is weatherproofed and secured against theft and vandalism. For instance, the display 132 may be mounted on the rear of the vehicle, on the roof of the vehicle, on the side of the vehicle, within the vehicle viewable through one or more windows the vehicle, or the like. In some instances, an owner of the vehicle 126, as a mobile ad platform participant 128, may determine where the display is located on the vehicle 126.

The mobile ad platform 106 may be mounted on or displayed on any type of vehicle such as an automobile, a bus, a truck, a bicycle, a motorcycle, a trailer, and so forth. Accordingly, implementations herein are not limited to the type of vehicle 126, the location of the display(s) 122 on the vehicle 126, or the like. Further, while in some implementations the mobile ad platform 106 is mounted on a vehicle 126, other implementations herein are not limited to being mounted on a vehicle. For example, the mobile ad platform may be mounted on a person or animal, or on an article or item carried by a person or animal. For example, the mobile ad platform 106 may be incorporated into a person's clothing, a backpack, or the like as is discussed additionally below with reference to FIG. 4.

In some implementations, the advertisement service 102 may predefine the geographic regions that an advertiser may select for placement of advertisements. In other implementations, the advertisement service may allow the advertiser to define a desired geographic region before or during bidding on the region. Thus, advertiser 104 may include geographic information 130 and bid information 132. The advertiser may submit bid information 132 in a bid for a particular geographic region based on geographic information 130. The advertisement service 102 may allow one or more advertisers 104 to bid for the right to display their advertisements on one or more mobile ad platforms 106 within one or more of the defined geographic regions. Thus, the advertisement service 102 may allow advertisers to bid on a price that they are willing to pay to advertise in a particular geographic region. For instance, the advertisement service 102 may request bids from the advertisers 104 to provide ad content to a mobile ad platform 106 when located in the various different defined geographic regions. In an alternative implementation, the advertisement service 102 may merely set a fixed price to be paid by an advertiser for advertising in a particular geographic region and accept the first advertiser that agrees to the fixed price.

When an advertiser 104 provides a successful bid in response to the bid request from the advertisement service 102, then the advertisement service 102 may provide an advertisement 118 associated with the successful advertiser to the mobile ad platform 106 when the mobile ad platform 106 is located within the corresponding defined geographic region. The mobile ad platform 106 may then display the advertisement as displayed ad 134. Thus, the displayed ad 134 is displayed on the display 122 in a manner that is publicly visible to one or more consumers 136. As used herein, a "consumer" may be any person that is not affiliated with the advertiser 104, the mobile ad platform 106 or the advertisement service 102, and that has the potential to purchase or otherwise obtain or utilize the goods or services advertised on the mobile ad platform 106. For example, the displayed ad 134 may encourage a passing consumer 136 to consider shopping at the advertiser's nearby business, or may provide an incentive, such as a coupon, to attempt to persuade consumers to visit the advertiser's business. Alternatively, the displayed ad 134 may be placed by an advertiser 104 that is a competitor to a nearby business.

As mentioned above, when the mobile ad platform 106 is determined by the advertisement service component 110 to be located within one of the geographic regions purchased by a particular advertiser 104, the ad information 114 for that advertiser 104 is communicated from the advertisement service 102 to the mobile ad platform 106. In some implementations, the ad information 114 may include the advertisement 118. In other implementations, the ad information 114 may merely be an instruction to the mobile ad platform 106 identifying an advertisement already maintained at the mobile ad platform. Alternatively, the ad information may be an instruction for the mobile ad platform 106 to obtain ad content for an advertisement 118 directly from the advertiser 104, rather than having the ad content provided by the advertisement service 102. For example, in this implementation, the advertiser 104 may have the advertisement 118 available on a web server, or the like, that can be accessed by the mobile ad platform when the mobile ad platform is within a geographic region that has been designated to the advertiser 104.

Additionally, in an alternative implementation, the mapping information 112 may also be maintained at the mobile ad platform 106. In this case, the mobile ad platform 106 may autonomously determine when to display an advertisement for a particular advertiser 104 based on the mapping information 112 and the location information. For example, the mapping information 112 and/or the ad information 114 may be downloaded to the mobile ad platform 106 on a periodic basis such as once a day, once a week, or the like.

As mentioned above, the displayed ad 134 may be displayed only when the vehicle 126 is parked, or may also be displayed while the vehicle 126 is in motion. Upon viewing of the displayed ad 134, the consumer 136 may read the displayed ad 134. In some implementations, the displayed ad 134 may include a coupon or other incentive to encourage the consumer 136 to partake of the goods or services offered by the ad 134. For example, the ad may display an SMS number, a bar code, or other information that the consumer 136 may obtain from the ad in order to receive the offered incentive. In some implementations, the user may use a mobile device 138 to obtain a coupon or other offered incentive from the displayed ad 134. Examples of such mobile devices 138 include smart phones 138-1, cellular phones 138-2, laptops netbooks or tablet computers 138-3, and eBook reader devices 138-4, to name a few.

The consumer 136 may use the mobile device 138 to provide ad verification information 140 to at least one of the advertisement service 102 or the advertiser 104. For instance, in the case of a displayed SMS number, the consumer 136 may dial the SMS number to receive a coupon, coupon code, or other incentive information 142 for receiving a discount for goods or services. Similarly, in the case of a displayed bar code, the consumer 136 may use a camera on the mobile device 138 to obtain an image of the bar code, which may itself serve as a coupon, or which may be used to direct the mobile device to a website at which the coupon can be obtained. In yet another example, the advertisement may display a web address that the consumer may access to obtain the coupon or incentive information 142. In still another example, the displayed ad 134 may display a coupon code that the consumer may write down and use at a local store or online. In addition, the advertiser 104 may maintain coupon information 144 to keep track of how many coupons are distributed through the displayed ad 134, how many coupons are redeemed from the displayed ad 134, and the like.

Various different compensation schemes may be implemented according to the techniques herein. For example, in a basic scheme, when the ad 134 is displayed in the predefined geographic region, notification of this may be provided to the advertisement service by the mobile ad platform 106. The advertisement service 102 may notify the advertiser 104 and secure payment 146 from the advertiser 104. The advertisement service 102 may also make a payment 148 to the mobile ad platform participant 128. Alternatively, the advertiser 104 may make payment 146 when the ad 134 has been shown to be effective, e.g., based on impressions made to consumers, such as when the consumer 136 obtains or uses a coupon 142, accesses the advertiser's website, makes a purchase using a supplied coupon code, and so forth. Thus, numerous different compensation arrangements are possible. For example, the advertiser 104 may submit a bid to pay for an ad to be displayed for a predetermined period of time in a particular geographic region. Alternatively, the advertiser 104 may bid to pay for the ad based on receiving confirmation of a predetermined number of impressions, such as may be received through receipt of ad verification information 140. Still alternatively, the advertiser may bid to pay for the ad based on displaying the ad for a predetermined period of time and also paying an additional amount for each confirmed impression received. Payments 146 from the advertiser to the ad service 102 and payments 148 from the ad service to the mobile ad platform participant 128 may be made through network(s) 108 or by other conventional methods.

While FIG. 1 illustrates an example architecture 100 that may implement the techniques described herein, many other similar or different architectures and environments are possible. The example architectures and environments discussed and illustrated above are merely representative and not limiting. Various other applications, functions and advantages are presented below with respect to the various implementations. It should be understood that the description and figures provide a number of examples, but not all possible alternatives and variations within the scope of the implementations herein may be fully described. These alternatives and variations, however, would be apparent to one of ordinary skill in the art in light of the teachings and suggestions contained herein. It should be understood that reference numbers are carried over between figures to identify similar elements for purposes of simplicity of explanation alone, and this should not be interpreted as limiting the scope of the various implementations or showing various options as part of the same implementation.

Figure 2:
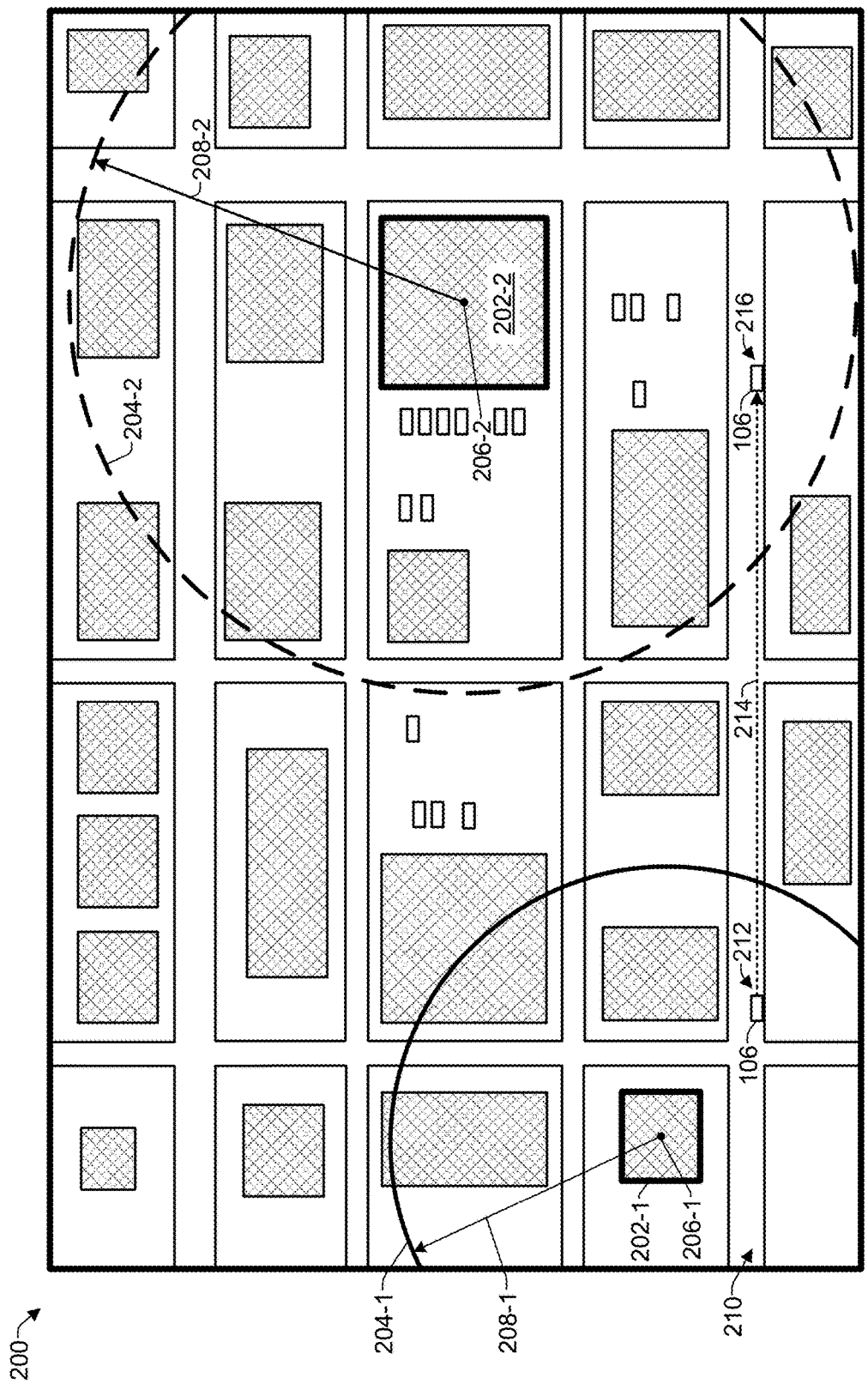
FIG. 2 illustrates an example geographic map that includes multiple defined geographic regions according to some implementations.

FIG. 2 illustrates an example geographic map 200 that includes multiple different entities 202, including a first entity 202-1 and a second entity 202-2. These entities may include one or more of retailers, restaurants, movie theaters, service providers, shopping malls, street intersections, city centers, or any other entity that has a determinable physical location. In some implementations, the advertisement service 102 may define one or more geographic regions 204-1 and 204-2 around the entities 202-1 and 202-2 respectively. For example, the advertisement service 102 may store (e.g., in a data store) a relationship between an entity 202 and a corresponding geographic region 204. However, in other implementations, the advertisement service 102 may allow an advertiser 104 to define a geographic region of interest to the advertiser.

The geographic regions 204 may be defined in any number of ways. For instance, each geographic region may comprise one or more points on the geographic map 200 (e.g., a particular GPS coordinate or a latitude/longitude pair) along with a certain amount of associated geographic area. For instance, the geographic region 204-1 may be defined as a particular point 206-1 on the map 200, as well as an area that is defined by a radius 208-1 surrounding this point 206-1. Similarly, the geographic region 204-2 may be defined as a particular point 206-2 and an area defined by a radius 208-2 surrounding the point 206-2. In one example, the first geographic region 204-1 for the first entity 202-1 may be a quarter-mile radius around the entity 202-1 while the second geographic region 204-2 for the second entity 202-2 may be a half-mile radius around the entity 202-2. As another possible example, the geographic regions in map 200 may be defined as a collection of points in the geographic space (e.g., a collection of GPS coordinates, latitude/longitude pairs, city blocks, proximity to cell towers or Wi-Fi stations, triangulation of Wi-Fi/cell towers, areas defined by satellite imaging and so forth).

While several examples have been provided, it is to be appreciated that the advertisement service 102 or any other third party may define these geographic regions in any other suitable manner. Further, in some implementations, the advertisement service 102 may divide an entire geographic area into discrete geographic regions. For example, the entire geographic area may be divided into a set of defined geographic regions that include no overlapping regions or gaps between regions. Additionally, in some implementations one or more defined geographic regions may overlap with one another.

FIG. 2 further illustrates a position of a mobile ad platform 106 located on a street 210 for discussion purposes. For example, suppose that the mobile ad platform 106 provides GPS information to the advertisement service 102. Based on the GPS information provided, the advertisement service 102 determines that the location of the mobile ad platform 106 corresponds to a first location 212 on the street 210. Upon the determining that the mobile ad platform 106 is located at the first location 212, the advertisement service 102 correlates the first location 212 with the mapping information 112, which may include map 200, and from this determines that the mobile ad platform 106 is currently located within the first defined geographic region 204-1. The advertisement service 102 may then determine that the entity 202-1 has purchased advertisement rights within this region. Consequently, the advertisement service 102 may identify or select an advertisement corresponding to the first entity 202-1 and may forward at least the identity of the advertisement to the mobile ad platform 106 as ad information 114. Upon receipt of the ad information 114, the mobile ad platform 106 displays the corresponding advertisement on the display 122.

Subsequently, suppose that the mobile ad platform 106 moves down the street 210 as indicated by dashed arrow 214 to a second location 216. The advertisement system 102 may receive location information from the mobile ad platform 106 that indicates that the mobile ad platform 106 is now at the second location 216. Similar to above, the advertisement service 102 correlates the second location 212 with the mapping information 112 (e.g., map 200) to determine that the mobile ad platform 106 is currently located within the second defined geographic region 204-2. The advertisement service 102 may then determine that the entity 202-2 has purchased advertisement rights within this region. Consequently, the advertisement service 102 may identify or select an advertisement corresponding to the second entity 202-2 and may forward at least the identity of the advertisement to the mobile ad platform 106 as ad information 114. Upon receipt of the ad information 114, the mobile ad platform 106 displays the corresponding advertisement on the display 122.

Figure 3:
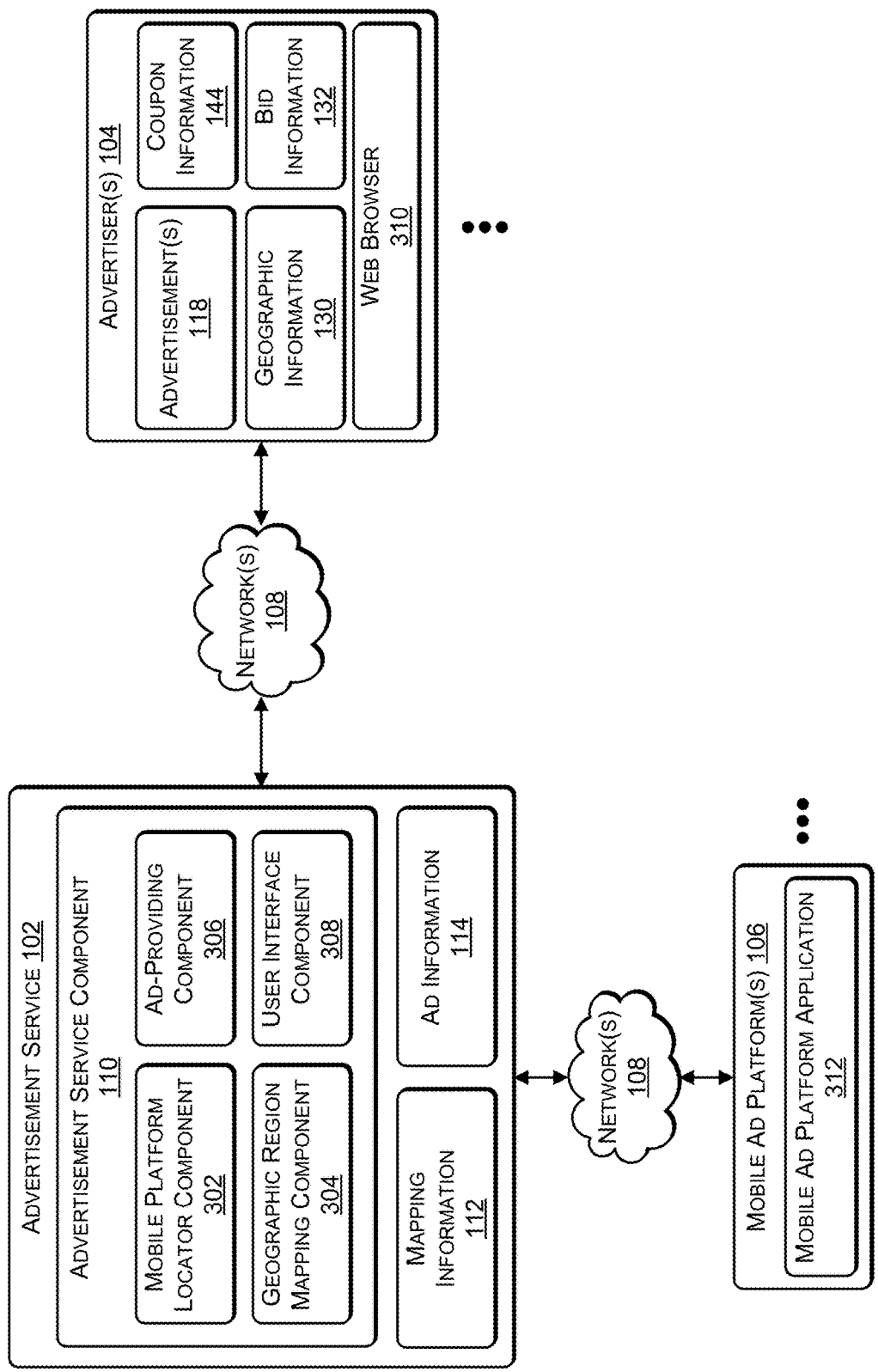
FIG. 3 illustrates additional components and functionality of the architecture of FIG. 1 according to some implementations.

FIG. 3 illustrates additional example components of the advertisement service 102 that may be implemented to perform the techniques described herein. These components may be part of advertisement service component 110, or may be separate components therefrom. In the illustrated example, the advertisement service component 110 includes a mobile platform locator component 302, a geographic region mapping component 304, an ad-providing component 306 and a user interface component 308.

The mobile platform locator component 302 may determine a location of a mobile ad platform 106 for determining whether a mobile ad platform 106 is located within a particular defined geographic region. The mobile platform locator component 302 may determine the location of the mobile ad platform in multiple different ways. In some instances, the mobile ad platform may be configured to transmit periodically location information to the advertisement service 102. For example, in some implementations, the location information may include GPS coordinates. In other implementations, the location information transmitted may include information regarding nearby cell towers, Wi-Fi access points or the like. For example, the mobile platform locator component 302 may determine the location of the mobile ad platform using, for example, wireless-signal triangulation, proximity to Wi-Fi stations, proximity to cell towers, and the like. In other instances, a user (i.e., the mobile ad platform participant 128) may manually enter location information into a user interface of the mobile ad platform 106 to provide location information to the advertisement service 102. In addition, in other implementations, the mobile platform locator component 302 may be included in the mobile ad platform 106 to enable the mobile as platform 106 to determine its location and autonomously select an advertisement corresponding to the determined location.

The geographic region mapping component 304 may generate or use the map 200 described above with reference to FIG. 2. For example, the map 202 may include geographic locations of a plurality of advertisers or other entities as described above. Accordingly, the map 200 may provide the advertisement service 102 with knowledge of different geographic locations of different entities. In some instances, a particular advertiser may be associated with a single geographic region, while in other instances several advertisers may share a single geographic region, such as in the case in which the advertised products or services do not compete with each other. In some implementations, advertisements of advertisers may also be associated with geographic regions so that the advertisements are identified directly based on location information from the mobile ad platform.

The ad-providing component 306 may be configured to provide or identify one or more advertisements to be displayed by a mobile ad platform upon determining the location of the mobile ad platform. For example, based, at least in part on the mobile ad platform 106 being located within a particular geographic region corresponding to a particular advertiser or advertisement, the ad-providing component 306 may provide identifying information of the advertisement of the particular advertiser that is to be displayed by the mobile ad platform in the identified particular geographic region. In some implementations, the ad-providing component 306 may forward the ad content of the identified advertisement to the mobile ad platform. In other implementations, the ad content may already be present at the mobile ad platform, and the ad-providing component merely communicates the identity of the selected advertisement to the mobile ad platform. In some implementations, the ad-providing component 306 may forward a link to the advertisement to the mobile ad platform to enable the mobile ad platform to download the advertisement from a location on a network, such as from an ad server of the advertiser 104, the advertisement service 102, or a third party.

The user interface component 310 provides a user interface to one or more advertisers 104. For example, the user interface may enable an advertiser to provide ad content to the advertisement service 102 and/or the mobile ad platform 106. Furthermore, the user interface component 308 may provide a user interface that allows advertisers 104 to bid on the right to have their advertisements displayed within a particular geographic region. In some implementations, the user interface component 308 may provide an HTML user interface that an advertiser 104 can access using a web browser 310 or other suitable mechanism. For example, the user interface component 308 may provide a web page or other functionality that enables advertisers to submit bids for displaying ads for a predetermined period of time, until a predetermined number of impressions are confirmed, or the like, in one or more selected geographic regions. Further, the user interface component 308 may provide information to advertisers and/or potential advertisers to assist advertisers in determining bid amounts, such as by providing current rates or winning bid amounts for one or more geographic regions. Additionally, in some instances, this information may be pushed to advertisers, such as through emails or other electronic communications. For example, the user interface component 308 may include an application program interface or other functionality to provide advertisers with information on available geographic regions, the number of mobile ad platforms likely to be in a particular geographic region, and so forth, to enable advertisers to make informed bids on desired geographic regions, ad type, ad duration, desired number of impressions, and the like. Through the receipt of such information, advertisers are able to build their own intelligence regarding the bid-selection process and gain confidence in the mobile ad platform system.

Further, the user interface component may receive an indication of a number of impressions that have occurred for a displayed advertisement. For example, the user interface component 308 may receive the ad verification information 140 from consumers or from the advertiser 104 indicating the number of impressions received for a particular ad. As mentioned above, the number of impressions for an ad may be determined based on various factors, such as a number of coupons obtained, a number of coupons redeemed, access to an advertiser's website based on a barcode or numeric code displayed in the ad, and text messages received at a telephone number displayed in the ad, as several non-limiting examples.

Additionally, in some implementations, the bids may be received from advertisers in real-time. For example, upon determining that a mobile ad platform 106 is located within a certain geographic region, the advertisement service 102 may take bids for advertisements at the certain geographic region in real-time and subsequently provide the advertisement of the winning bidder to the mobile ad platform. However, in other implementations, the advertisers may bid for the right to advertise within the certain geographic region for a set period of time such as one day, one week, one month, or the like. Other variations will also be apparent to those of skill in the art in light of the disclosure herein. Furthermore, while bidding by advertisers is described as one example by which advertisers may obtain the right to provide advertisements, implementations herein are not limited to this example. Accordingly, other techniques and schemes may be used for designating geographic regions to particular advertisers. For example, an advertiser may purchase the rights in a geographic region in numerous other manners such as by paying a set amount, speaking to a human operator of the advertisement service 102, or the like.

The user interface component 308 may also provide a user interface to the mobile ad platform participant 128 that is transporting the mobile ad platform 106. For example, the mobile ad platform 106 may include a mobile ad platform application 312 that interacts with the user interface component 308 to enable the advertising party to activate the mobile ad platform 106 and set any personal preferences, options or the like. For example, in some implementations, the mobile ad platform participant 128 may choose which type of ads will be accepted for advertisement on the mobile ad platform transported by the particular mobile ad platform participant 128. Additionally, other preferences might be set such as the time of day that ads are displayed, the frequency with which ads are displayed, and the like.

Figure 4:
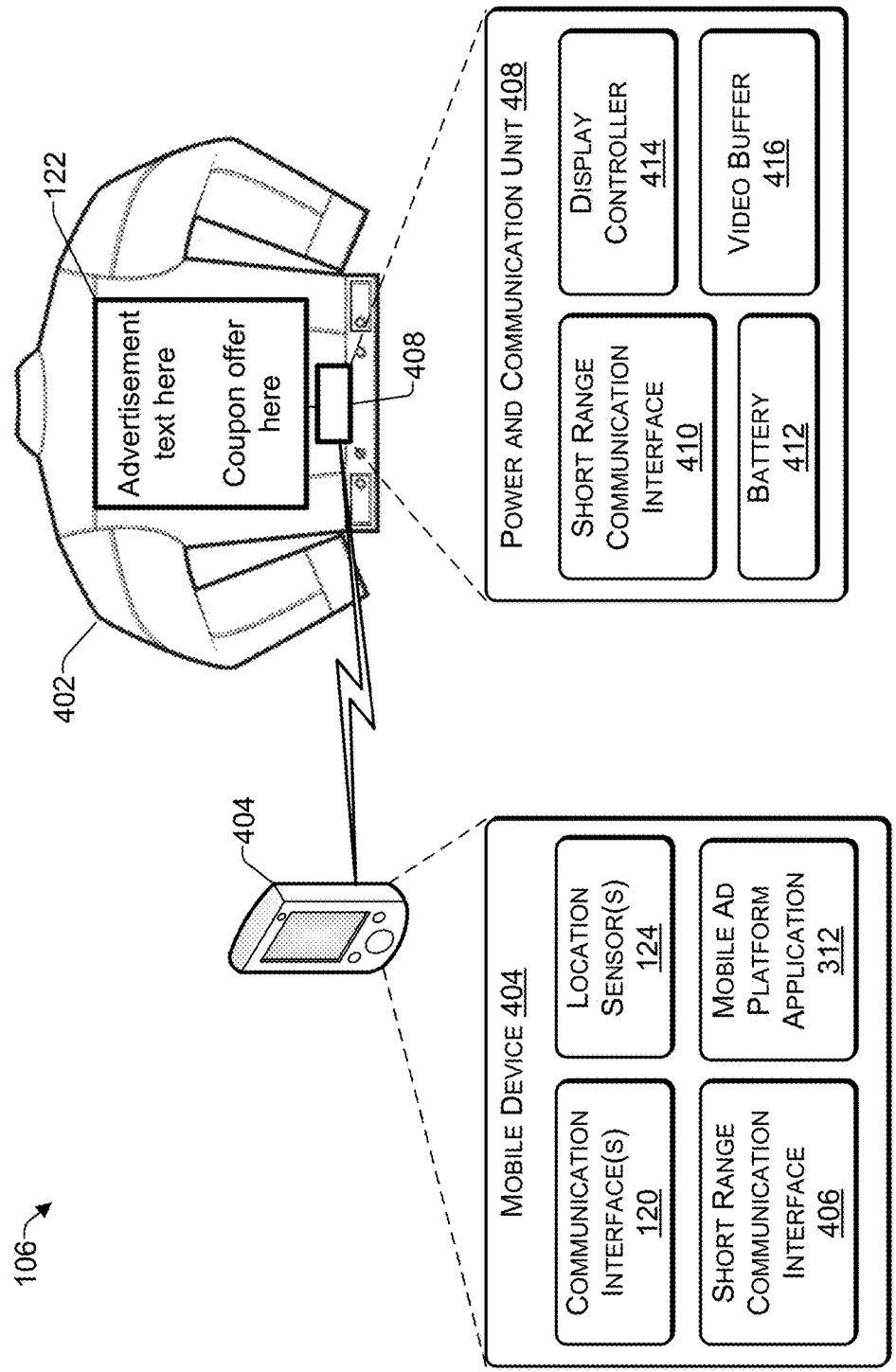
FIG. 4 illustrates an architecture of a mobile ad platform according to some implementations.

FIG. 4 illustrates another example of the mobile ad platform 106 according to implementations herein. As mentioned above, the mobile ad platform 106 may not necessarily be mounted on a vehicle. Instead, for example, the display 122 may be a wearable or flexible display that may be integrated into an article of clothing 402, such as on the back of a jacket, shirt, or the like. Still alternatively, the mobile ad platform 106 may be incorporated into a backpack or other transportable item or article (not shown in FIG. 4).

In the illustrated example, the article of clothing 402 may have the display 122 mounted on an exterior surface such as the back of the article of clothing 402 For example, the display 122 mounted in such a manner is viewable by people walking behind the wearer of the article of clothing 402. Thus, the mobile ad platform participant 128 may wear the article of clothing 402 or a backpack having the wearable display 122, and the mobile ad platform 106 may otherwise function in the same manner as described above.

Additionally, in some implementations, a mobile device 404 of the mobile ad platform participant 128, such as a smart phone, may provide some of the components of the mobile ad platform 106. For example, the communication interfaces 120, the location sensors 124 and the mobile ad platform application 312 of the mobile ad platform 106 may be included in the mobile device 404. Furthermore, the mobile device 404 may be configured by the mobile ad platform application 312 to communicate with the display 122 through a short-range communication interface 406 provided by the mobile device 404. An example of a suitable short-range communication interface 406 is Bluetooth®. Furthermore, in some implementations, the display 122 may be powered separately from the mobile device 404 by a power and communication unit 408. The power and communication unit 408 may include a short range communication interface 410 for communicating wirelessly with the mobile device 404, a rechargeable battery 412 for powering the display, a short-range communication interface 410, a display controller 414 for controlling the display 122, and a video buffer 416 for buffering ad content that is delivered from the mobile device 404 to the display controller 414.

Mobile Platform Advertising Examples

Figure 5A:
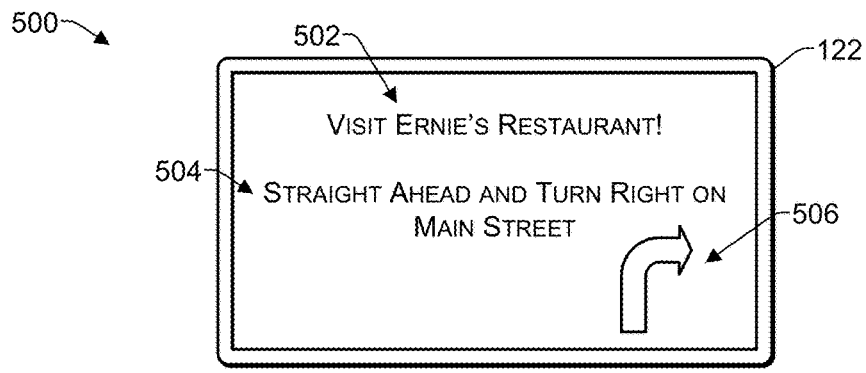
FIGS. 5A-5C illustrate an example of a dynamic advertisement according to some implementations.
Figure 5B:
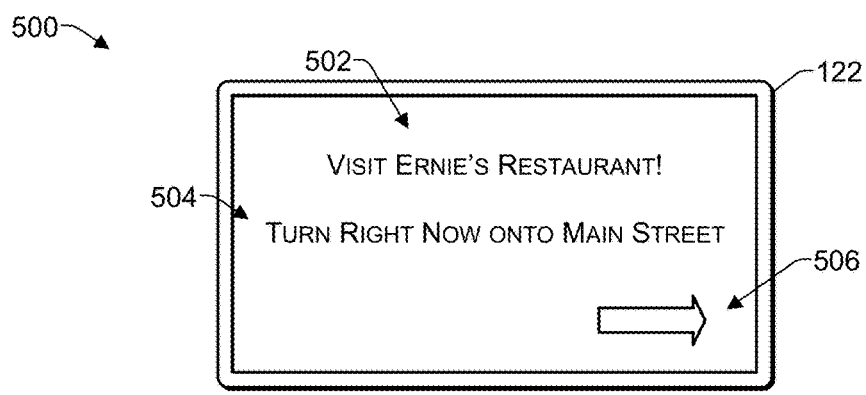
Figure 5C:
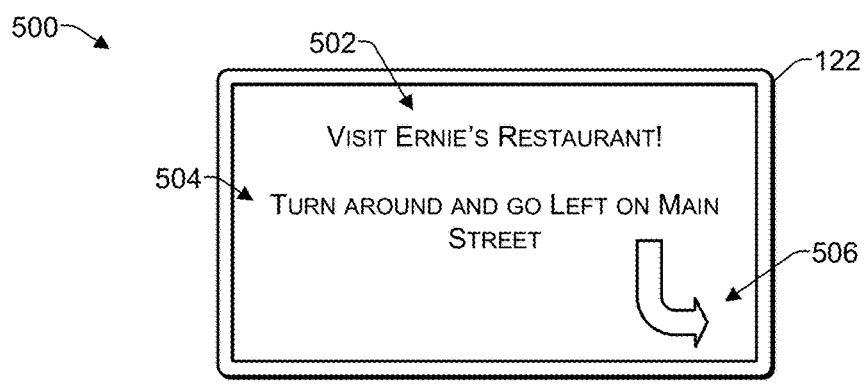

FIGS. 5A-5C illustrate an example of a dynamic advertisement 500 that may be displayed on the mobile ad platform 106, such as when the mobile ad platform 106 is located within a particular geographic region for which an advertiser has purchased advertisement rights. As mentioned above, the mobile ad platform locator component 302 may determine that the mobile ad platform 106 is within the particular geographic region based on location information associated with the mobile ad platform 106. Upon correlating the location of the mobile ad platform with the particular geographic region, the advertisement service 102 may deliver a selected advertisement to the mobile ad platform 106 for display on the display 122.

In some instances, the advertisement 500 may be dynamically adjusted or changed based on the current location of the mobile ad platform 106. The advertisement 500 may include advertisement text, images, video, or the like, as part of the ad content. In the illustrated example, advertisement text 502 is included in the ad 500 displayed on the display 122. Also included in the advertisement 500 are at least one of written directions 504, such as displayed text, and symbolic directions 506, such as a map and/or a direction arrow. In some implementations, the written directions 504 and/or the symbolic directions 506 may dynamically change based on the determined location of the mobile ad platform 106. For example, if the mobile ad platform is located on a first street, and the advertiser's business is located ahead and to the right on Main Street, the written directions 404 and the symbolic directions 506 may indicate this location. For instance, the location of the advertiser's business may be determined from the mapping information 112 possessed by the advertisement service 102. From this determination, directions 504 and 506 to the advertiser's business from the current location of the mobile ad platform 106 can be automatically generated and included in the ad content displayed with the advertisement 500.

As mentioned above, the advertisement 500 may be displayed either when the mobile ad platform is parked in a fixed location or while the mobile ad platform 106 is in motion. In either situation, the advertisement 500 may change dynamically as the mobile ad platform 106 moves from a first location to a second location. For instance, in the example described above, as the vehicle carrying the mobile ad platform 106 drives down the first street, and approaches Main Street, the advertisement 500 may be changed from the configuration in FIG. 5A to the configuration shown in FIG. 5B. In the example advertisement 500 in FIG. 5B, the written directions 504 and the symbolic directions 506 have changed to indicate that the advertiser's business is now to the right rather than ahead and to the right. Similarly, as illustrated in FIG. 5C, when the mobile ad platform 106 moves to a third location that is past Main Street, the written and symbolic directions 504, 506 may change again to indicate that the location of the advertiser's business is now behind the mobile ad platform 106.

Figure 6A:
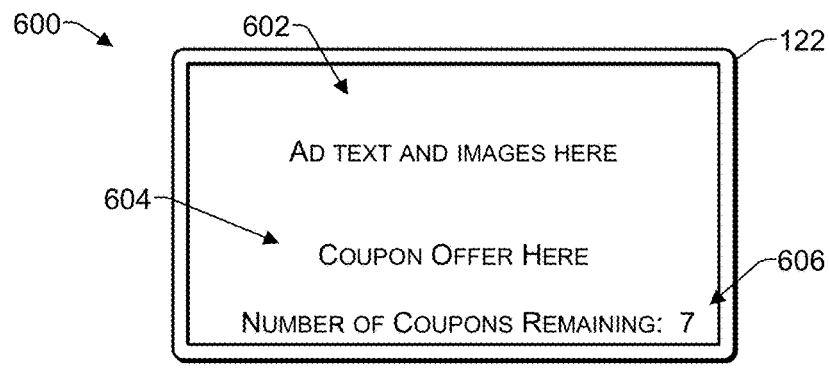
FIGS. 6A-6C illustrate examples of dynamic coupon advertisements according to some implementations.
Figure 6B:
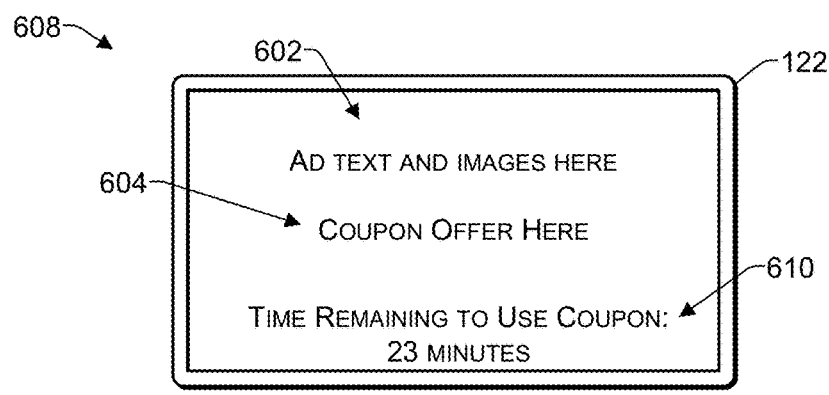
Figure 6C:
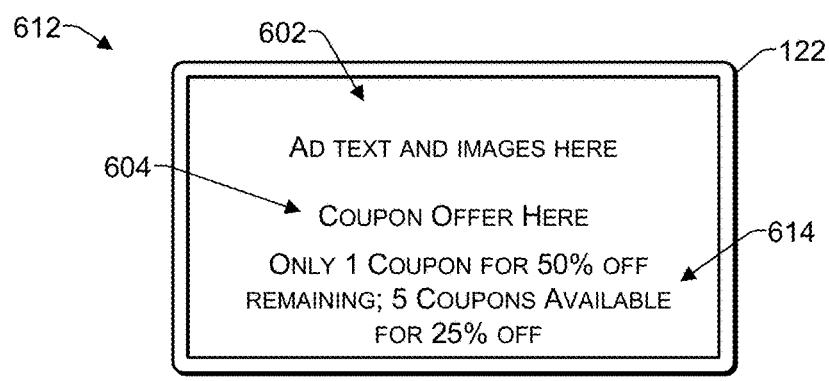

FIGS. 6A-6C illustrates several example of dynamic coupon offers that may be included in some implementations herein. As illustrated in FIG. 6A, an advertisement 600 may include ad content 602, such as text, images, videos, or the like, displayed on the publicly visible display 122. The advertisement 600 may also include a coupon or incentive offer 604 such as a discount for an offered good or service. In addition, in some implementations, to add a sense of urgency to potential consumers, the number of coupons offered may be limited, and the number of remaining coupons available may be indicated on the display 122 as shown at 606. Accordingly, as coupons are obtained and/or redeemed by consumers the number of coupons remaining counts down on the display 122. For example, as described above, consumers having mobile devices may obtain or redeem a coupon using various techniques, such as by taking a picture of a barcode in the advertisement 600, accessing a web address shown in the advertisement 600, dialing a number shown in the advertisement 600, using an access code displayed in the advertisement 600, showing a photograph of the advertisement 600 to a cashier at the advertiser's business, or the like.

FIG. 6B illustrates another example of a dynamic coupon advertisement 608 in which, as shown at 610, a time remaining to use the coupon is displayed in the ad 608. For example, the time remaining to obtain or use a coupon may countdown as time passes and may indicate an amount of time that a consumer may have to obtain or redeem a coupon associated with the advertisement. For instance, the coupons in this implementation may be obtained or redeemed in any of the manners discussed above.

FIG. 6C illustrates another example of a dynamic coupon advertisement 612 in which, as shown at 614, a limited number of coupons are offered at a first value, and subsequent coupons decrease in value. For example, the first five coupons offered may provide a 50% discount, while the next five coupons may provide a 25% discount, while subsequent coupons may provide a lower discount until all the coupons have been depleted. The coupons in this implementation may be obtained or redeemed in any of the manners discussed above.

Furthermore, in some implementations, an advertiser may wish to dynamically increase or decrease the number of coupons or ads currently being displayed. For example, suppose that a restaurant owner notices that on a particular night there are fewer than the normal number of reservations already made for that night. Upon noticing this, the restaurant owner may submit a larger bid to the advertisement service to obtain a larger geographic region for advertisement, more mobile ad platforms to display the advertisement, or may increase the amount of the incentive in coupons offered by the advertisements to attempt to secure more patronage for that night. Similarly, in an opposite situation in which the a restaurant is too crowded, the restaurant owner may interactively contact the advertisement service 102 to change an advertisement, terminate the advertisement early, stop offering coupons, lower the incentive offered by the coupons, or the like. Thus, an advertiser may access the user interface of the advertisement service to change the advertisement currently being displayed on the mobile ad platform in a particular geographic region. In some implementations, the advertiser may change the advertisement that is currently publicly displayed on the mobile ad platform in real time or near real time. Numerous other variations will be apparent to those of skill in the art in view of the disclosure herein.

Example Process

Figure 7:
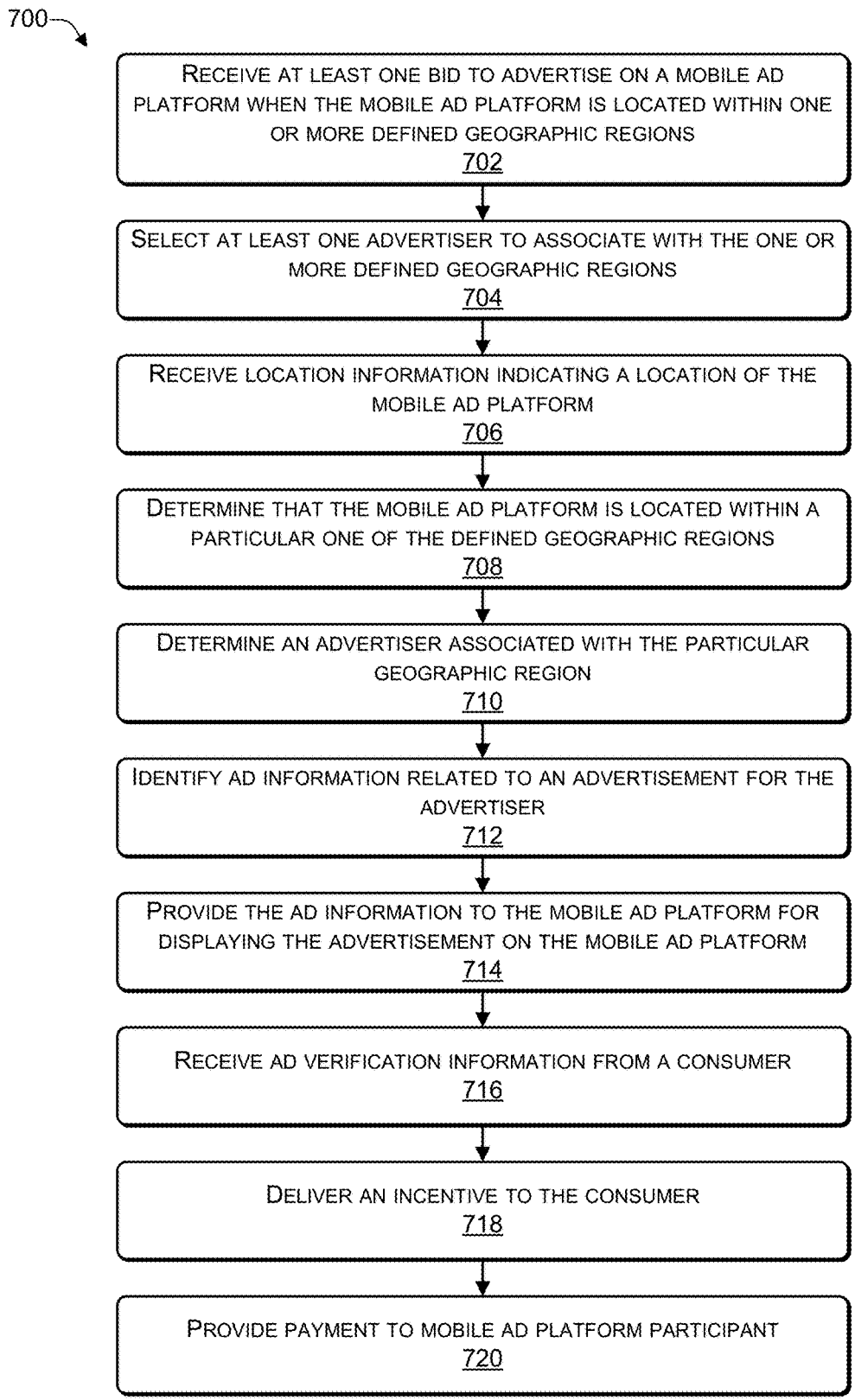
FIG. 7 is a flow diagram illustrating an example process for associating an advertiser with a geographic region and providing an advertisement to a mobile ad platform within the geographic region according to some implementations.
Figure 8:
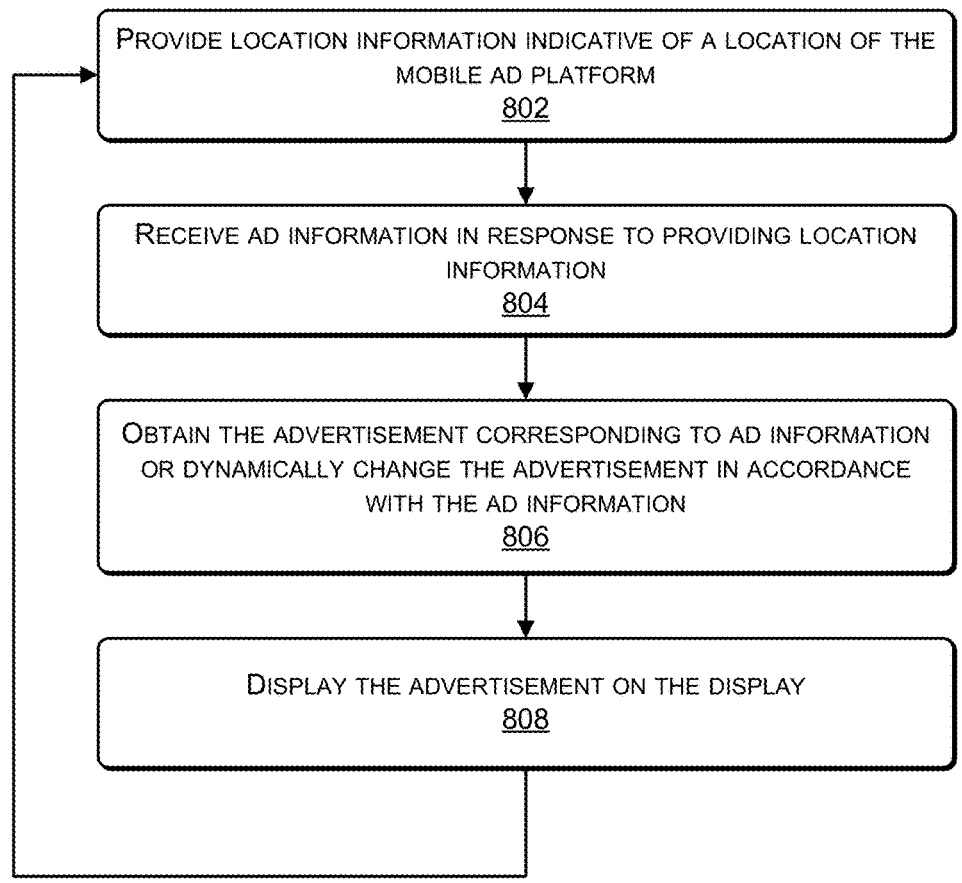
FIG. 8 is a flow diagram illustrating an example process for displaying an advertisement on a mobile ad platform according to some implementations.
Figure 9:
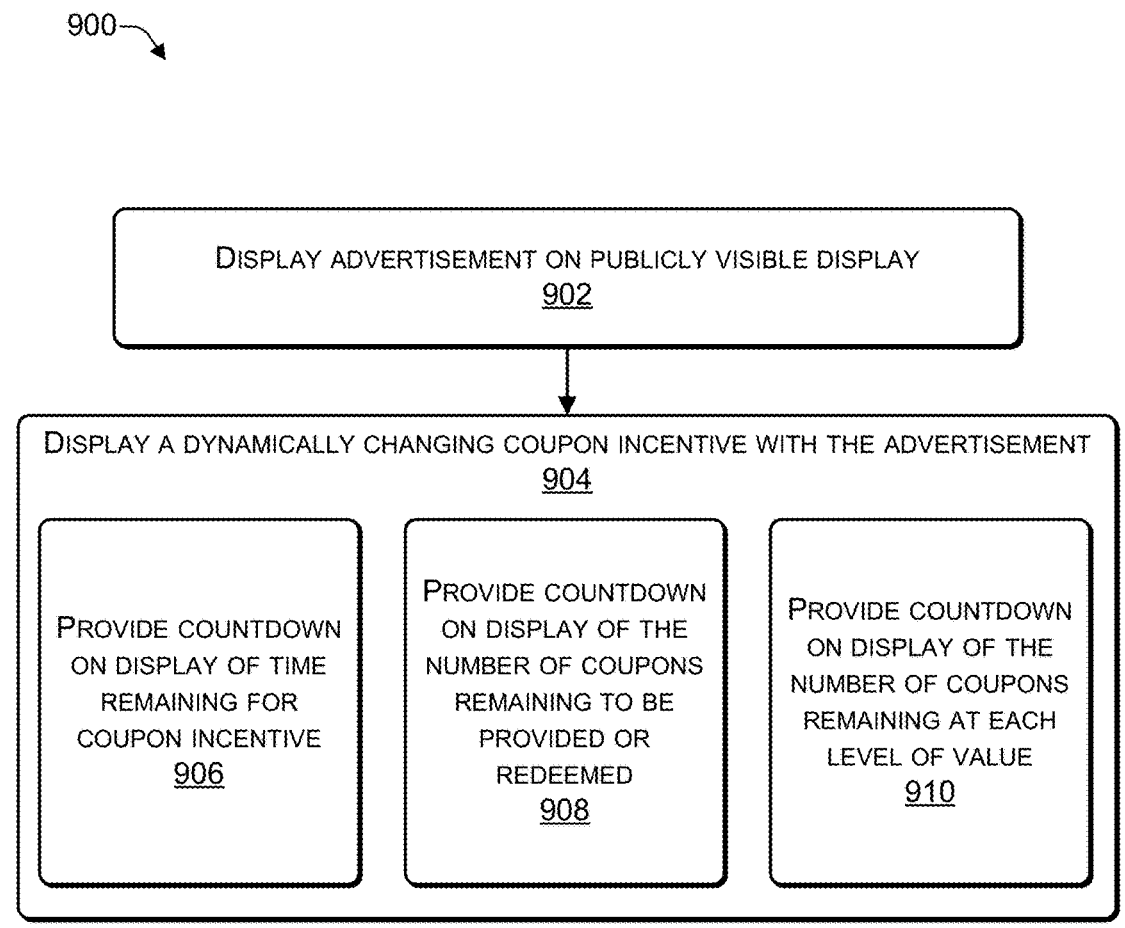
FIG. 9 is a flow diagram illustrating an example process for dynamically changing coupons according to some implementations.

FIGS. 7-9 illustrate example processes for implementing the techniques described above for an advertisement service including a mobile ad platform. These processes are illustrated as a collection of operations in logical flow graphs, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to the architectures and environments described in the examples herein, although the processes may be implemented in a wide variety of other architectures, apparatuses or environments.

FIG. 7 is a flow diagram illustrating an example process for associating an advertiser with a geographic region, receiving bids from one or more advertisers to provide ad content to a mobile ad platform, determining when a mobile ad platform is located within a particular geographic region, and providing an advertisement to the mobile ad platform.

At block 702, the advertisement service 102 receives at least one bid to advertise on a mobile ad platform when the mobile ad platform is located within one or more defined geographic regions. For example, the advertisement service 102 may predefine a plurality of geographic regions for advertising. Alternatively, the advertisement service 102 may allow potential advertisers to define their own desired geographic regions. In some implementations, the advertisement service 102 may associate one or more entities with a geographic region in which the one or more entities are located. Further, the advertisement service 102 may store an indication of these associations in a data store as mapping information. In some instances, the advertisement service associates multiple different entities with multiple different geographic regions to create a database that may include an array of different advertisers corresponding to businesses physically located within the defined geographic regions and competitors of those businesses. The advertisement service 102 may solicit bids from these businesses and/or their competitors, and in response receive at least one bid for advertising on mobile platforms in the defined geographic regions. The advertisement service 102 may receive the advertiser's advertisement in a submission with the bid or at an earlier or later time. In some implementations, the advertisement service 102, in response to selecting the winning bid, requests the advertisement from the advertiser that provided the winning bid. The advertisement (e.g., ad content, a link to the ad content, etc.) may be returned by the advertiser and stored by the advertisement service 102 with the ad information. The advertisement service 102 may deliver the ad content to the mobile ad platform on an as-needed basis in real time, or in advance. In some implementations, the advertiser provides a link to the ad content to the advertisement service 102, and the mobile ad platform 106 uses this link to retrieve the advertisement from an ad server identified by the link when displaying the advertisement.

At block 704, the advertisement service 102 selects at least one advertiser to associate with at least one of the one or more defined geographic regions. For example, the advertisement service 102 may select the highest bidder for each defined geographic region. In some implementations, the advertisement service 102 may select several of the highest bidders for each defined geographic region such as for displaying ads sequentially, side-by-side, or the like.

At block 706, the advertisement service 102 receives location information indicating a location of the mobile ad platform 106. The advertisement service 102 may determine the location of the mobile ad platform 106 in any number of ways. For instance, the advertisement service 102 may receive GPS coordinates or other location information from the mobile ad platform 106 based on an event (e.g., a periodic push of location information) generated by an application on the mobile ad platform 106. In one implementation, the event generated by the application 312 on the mobile ad platform 106 is an ad request generated by the application for requesting ad content in response to detecting that the vehicle carrying the mobile ad platform has parked.

At block 708, the advertisement service 102 determines that the mobile ad platform 106 is located within a particular one of the defined geographic regions. For example, based at least in part on the received location information, the advertisement service 102 may compare a location determined for the mobile ad platform 106 with the defined geographic regions. For instance, in the case that the geographic region is defined by a set of geographic points (e.g., longitude and latitude coordinates), the GPS coordinates or other location information received by the advertisement service 102 indicate whether the mobile ad platform 106 is located within the defined geographic region. Conversely, where the geographic region is defined as a single point with a threshold distance (e.g., a radius) specified around that point, the advertisement service 102 may determine whether the mobile ad platform 106 is located within one of the defined geographic regions by determining whether the mobile ad platform 106 is located within the threshold distance from the single point. Numerous other variations will be apparent in view of the disclosure herein.

At block 710, the advertisement service 102 identifies an advertiser associated with the particular geographic region. For example, the advertisement service 102 may store identities of advertisers that have successfully bid for advertising rights in the defined geographic regions. Accordingly, upon identifying the particular geographic region within which the mobile ad platform 106 is currently located, the advertisement service 102 may identify the advertiser for that geographic region. Further, in some implementations, the advertisement of the advertiser may also be associated with the geographic regions, thus making it unnecessary to actually identify the advertiser, as the advertisement may be identified directly based on the location information for the mobile ad platform.

At block 712, the advertisement service 102 identifies ad information related to an advertisement for the identified advertiser. For example, the advertisement service may identify an advertisement stored by the advertisement service or may identify a location from which the advertisement may be obtained.

At block 714, the advertisement service 102 provides the ad information to the mobile ad platform 106 for displaying the advertisement on the mobile ad platform 106. For example, the ad information may include the ad content delivered with it, or may merely identify the advertisement or a source from which the mobile ad platform 106 may obtain the advertisement.

At block 716, in some implementations, the advertisement service may receive ad verification information from a consumer. For example, if the advertisement includes an SMS number, a bar code, a website address, or other information that enables a consumer to obtain an incentive, or the like, from the displayed advertisement, this can be configured to result in the advertisement service 102 receiving verification information that a consumer has viewed and responded to the advertisement. Alternatively, in some implementations, the advertiser may receive the ad verification information. Further, in some implementations, ad verification information is not received at all.

At block 718, in response to receiving ad verification information from a consumer, the advertisement service and/or the advertiser may respond by delivering an incentive to the consumer. For example, a coupon or other incentive offer may be delivered to the consumer such as to a mobile device of the consumer or the like.

At block 720, the advertisement service may provide payment to the mobile ad platform participant. For example, the owner of the vehicle on which the mobile ad platform is mounted may receive a payment under various different payment schemes. For example, the participants may receive payment when the ad is displayed, when ad verification information is received, when a coupon is redeemed, or under various other scenarios.

FIG. 8 is a flow diagram illustrating an example process 800 that may be carried out by the mobile ad platform for displaying an advertisement according to some implementations.

At block 802, the mobile ad platform 106 provides location information indicative of a location of the mobile ad platform. For example, in some implementations, the location information may be provided to the advertisement service 102. In other implementations, the location information may be provided to an application running on the mobile ad platform. Further, in some instances, the location information may only be provided following parking of the vehicle on which the mobile ad platform is mounted.

At block 804, the mobile ad platform 106 receives ad information in response to providing the location information. For example, when the location information is provided to the advertisement service 102, the advertisement service 102 may provide the ad information to the mobile ad platform over a network, such as through wireless communication. Alternatively, in the implementations in which the location information is provided to the application executing on the mobile ad platform, the application may determine the ad information autonomously based on advertisement and mapping information stored at the mobile ad platform.

At block 806, the mobile ad platform obtains an advertisement corresponding to the ad information or dynamically changes the advertisement in accordance with the ad information. For example, when the ad information is provided by the advertisement service 102, the advertisement may also be included with the ad information. Alternatively, the ad information received from the advertisement service may include an identity of an advertisement already stored at the mobile ad platform, or may provide a link to be used by the mobile ad platform for downloading the advertisement from another source, such as an ad server. Still alternatively, the mobile ad platform may autonomously identify the advertisement from among one or more advertisements stored at the mobile ad platform, or may autonomously determine a location from which to download the advertisement. Additionally, in the situation in which an advertisement is already displayed on the display, the provided location information may be used to change the advertisement dynamically, such as to change directions to a business that are provided in the advertisement in response to a change in the location of the mobile ad platform. As mentioned above, the new directions may be determined by the advertisement service 102 or may be determined autonomously by the mobile ad platform.

At block 808, the mobile ad platform displays the advertisement on one or more displays included with the mobile ad platform 106. For example, the advertisement may be displayed for a predetermined period of time, and may be followed by the display of another advertisement from another advertiser. Alternatively, the advertisement may be displayed as long as the mobile ad platform remains at the current location. The process 800 may repeat continually as the mobile ad platform provides additional or new location information.

FIG. 9 is a flow diagram illustrating an example process 900 that may be carried out for displaying and providing coupons in association with an advertisement according to some implementations.

At block 902, an advertisement is displayed on a publicly visible display. For example, the publicly visible display may be the publicly visible display 122 included on the mobile advertising platform 106 according to the implementations described herein.

At block 904, a dynamically changing coupon incentive is displayed with the advertisement on the publicly visible display. For example, the coupon incentive may change with the passage of time, as coupons are obtained or redeemed, and so forth.

At block 906, a countdown is provided on the publicly visible display showing the time remaining for consumers to take advantage of the coupon incentive. For example, when the countdown reaches zero, the coupon incentive may end.

At block 908, a countdown is provided on the publicly visible display showing the number of coupons remaining to be provided or redeemed. For example, as members of the public obtain coupons, the number of coupons remaining shown on the display may be reduced by a corresponding number. When the number of coupons remaining reaches zero, the coupon incentive may end.

At block 910, a countdown is provided on the publicly visible display of the number of coupons remaining at each level of value of multiple levels of value. For example, a first number of coupons may be offered at a first level of value, a second number of coupons may be offered at a second lesser level of value, a third number of coupons may be offered at a third still lesser level of value and so forth. As the coupons at each higher level of value are depleted, the coupons at the next lower level of value are subsequently offered until all the available coupons are depleted.

Figure 10:
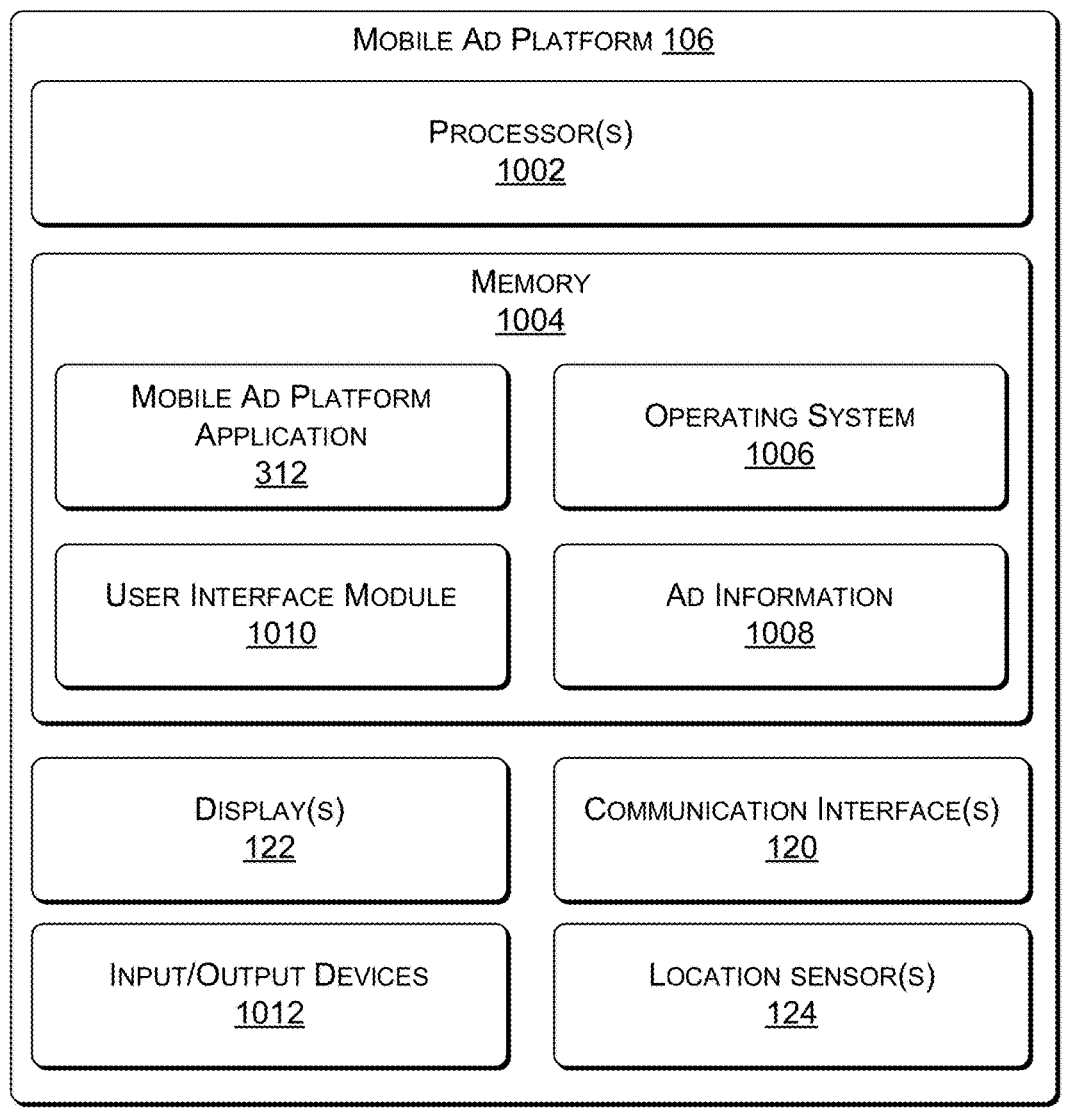
FIG. 10 illustrates select components of an example mobile ad platform according to some implementations.

The example processes described herein are only examples of processes provided for discussion purposes. Numerous other variations will be apparent to those of skill in the art in light of the disclosure herein. Further, while the disclosure herein sets forth several examples of a suitable architecture and environment, implementations herein are not limited to the particular examples shown and discussed.
Example Mobile Ad Platform FIG. 10 illustrates select relevant components and information that the example mobile ad platform 106 of the architecture of FIG. 1 may include, store, use, or otherwise have access to according to some implementations herein. In a very basic configuration, the mobile ad platform 106 includes one or more processors 1002 and a memory 1004. Depending on the configuration of the mobile ad platform 106, the memory 1004 may be a type of computer readable storage media and may include volatile and nonvolatile memory. Thus, the memory 1004 may include, but is not limited to, RAM, ROM, EEPROM, flash memory or other memory technology or any other medium that can be used to store media items or applications and data which can be accessed by the mobile ad platform 106. Additionally, in some implementations, memory 1004 may also include mass storage, such as one or more hard disk media, solid state media, optical media, and the like.

The memory 1004 may be used to store any number of functional components that are executable on the processors 1002. In many implementations, these functional components comprise instructions or programs that are executable by the processors 1002 and that implement operational logic for performing the actions attributed above to the mobile ad platform 106. In addition, the memory 1004 may store various types of data that are referenced by the executable components.

The memory 1004 may store the mobile ad platform application 312, which is executable on the processors 1002 to perform some or all of the actions attributable to the mobile ad platform 106 discussed above. For instance, the mobile ad platform application 312 may send the location information 116 to the advertisement service 102 periodically, continuously or in any other manner. The mobile ad platform application 312 may also display the advertisements received from the advertisement service 102. In some instances, the mobile ad platform application 312 performs additional functionality other than simply displaying advertisements, while in other instances the mobile ad platform application 312 is a standalone application.

Memory 1004 may also store an operating system 1006 that may manage and coordinate the various functions of the mobile ad platform 106. Further, memory 1004 may store ad information 1008 that may include one or more received advertisements and other information, such as geographic regions in which the ads are to be displayed. A user interface module 1010 may also be provided in the memory 1004 and executed on the processors 1002 to provide for user operation of the mobile ad platform 106. The user interface module 1010 may provide menus and other navigational tools to facilitate operation of mobile ad platform 106. The user interface module 1010 may further include a browser or other application that facilitates access to sites over a network, such a website of the advertisement service 102.

The mobile ad platform 106 may further include one or more displays 122 upon which advertisements may be rendered. The mobile ad platform 106 may further be equipped with various input/output devices 1012. Such devices may include various user interface controls (e.g., buttons, joystick, keyboard, touch screen, etc.), audio speakers, connection ports and so forth.

One or more communication interfaces 120, as described above, may support both wired and wireless connection to various networks, such as cellular networks, radio, Wi-Fi networks, short-range networks (e.g., Bluetooth®), infrared, and so forth. The communication interfaces 1018 may facilitate sending location information to and receiving advertisements from the advertisement service 102 as described herein. The mobile ad platform 106 may also include one or more location sensors 124 for determining a current location of the device. The location sensors 124 may include a GPS unit or any other sensor capable of providing input used for determining or inferring a location of the mobile ad platform 106. Further, the mobile ad platform 106 may have additional features or functionality not shown, depending on incorporation of the variations described herein and any other intended use of the mobile ad platform 106.

Example Advertisement System Computing Device

Figure 11:
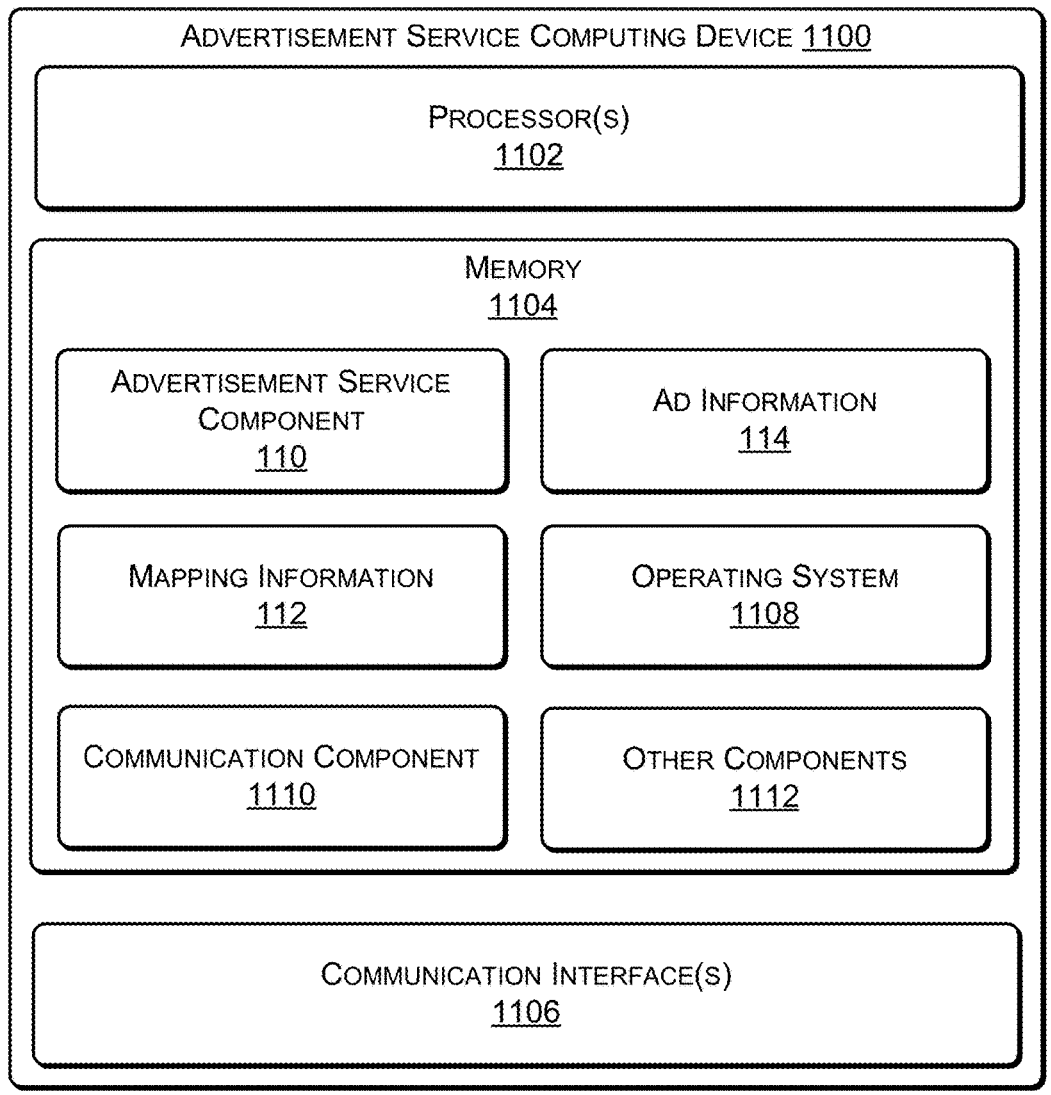
FIG. 11 illustrates select components of an example advertisement service computing device according to some implementations.

FIG. 11 illustrates select relevant components of an advertisement service computing device 1100 that may be used to implement the functionality of the advertisement service 102 according to some implementations. For example, the advertisement service 102 may be hosted on servers or one or more other types of computing devices that may be embodied in any number of ways. For instance, in the case of a server, the advertisement service 102 may be implemented on a single server, a cluster of servers, a server farm or data center and so forth, although other server architectures (e.g., a mainframe architecture) may also be used. Further, while FIGS. 1 and 3 illustrate the components of the advertisement service 102 as being present in a single location, it is to be appreciated that these components may be distributed across different computing devices and locations in any manner. Generally, the advertisement service 102 may be implemented by one or more computing devices, with the various functionality described above distributed in various ways across the different computing devices. The computing devices may be located together or separately, and organized, for example, as virtual servers, server banks and/or server farms. The described functionality may be provided by the servers of a single entity or enterprise or may utilize the servers and/or services of multiple entities or enterprises.

As illustrated, the advertisement service computing device 1100 may include one or more processors 1102, a memory 1104, and one or more communication interfaces 1106. The memory 1104 may include volatile and nonvolatile memory and/or removable and non-removable media implemented in any type or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems or any other medium which can be used to store the desired information and which can be accessed by a computing device. Depending on the configuration of the computing device 1100, the memory 1104 may be a type of computer readable storage media and may be a non-transitory storage media.

The memory 1104 may be used to store any number of functional components that are executable by the processors 1102. In many implementations, these functional components comprise instructions or programs that are executable by the processors 1102 and that, when executed, implement operational logic for performing the actions attributed above to the advertisement service 102.

Functional components stored in the memory 1104 may include the advertisement service component 110 as described above, which may be executed on the processors 1102 for implementing the various functions and features of the advertisement service 102 described herein. In some implementations, the advertisements service component may include the mobile platform locator component 302, the geographic region mapping component 304, the ad-providing component 306, and the user interface component 308 (not shown in FIG. 11), as described above with reference to FIG. 3. The memory 1104 may also store ad information 114, including one or more advertisements, and mapping information 112, including indications of geographic regions and locations, as discussed above.

Additional functional components stored in the memory 1104 may include an operating system 1108 for controlling and managing various function of the advertisement service computing device 1100. Functional components of the computing device 1100 may also include a communication component 1110 that interacts with remote devices such as computing devices of the advertisers 104 and the mobile ad platforms 106. The computing device 1100 may also include many other logical, programmatic and physical components, generally referenced by numeral 1112, of which those described above are merely examples that are related to the discussion herein.

The communication interface(s) 1106 may include one or more interfaces and hardware components for enabling the communication component 1110 to communicate with various other devices, such as the advertiser computing devices and the mobile ad platform 106 over the networks(s) 108. For example, communication interface(s) 1106 may facilitate communication through one or more of the Internet, cable networks, cellular networks, wireless networks (e.g., Wi-Fi, cellular) and wired networks.

Various different approaches to implementations described herein can be implemented in various environments. As will be appreciated, although a Web-based environment has been used for purposes of explanation, different environments may be used, as appropriate, to implement various implementations. For example, the network(s) 108 may include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:
1. A method comprising:
providing a mobile ad platform application for installation on a mobile ad platform;
receiving, by one or more processors, from at least one advertiser, at least one bid to provide an advertisement on a publicly visible display of the mobile ad platform when the mobile ad platform is located within a particular geographic region of a plurality of geographic regions;
selecting, by the one or more processors, an advertiser to be associated with the particular geographic region based, at least in part, on the at least one bid;
receiving, by the one or more processors, from the mobile ad platform, location information indicating that the mobile ad platform is located within the particular geographic region;
determining, by the one or more processors, the advertiser associated with the particular geographic region;
identifying, by the one or more processors, ad information related to a particular advertisement for the advertiser determined to be associated with the particular geographic region;
determining direction information based at least in part on the location information, the direction information for navigating from a location of the mobile ad platform to a business of the advertiser located in the particular geographic region;
providing, by the one or more processors, the ad information and the direction information to the mobile ad platform, the ad information and the direction information activating the mobile ad platform application to display, on the publicly visible display of the mobile ad platform located within the particular geographic region, the particular advertisement together with a set of directions for navigating to the business;
receiving ad-verification information from a mobile device of a consumer in response to the particular advertisement displayed on the publicly visible display, wherein the mobile device is separate from the publicly visible display and the mobile ad platform;
receiving additional location information from the mobile ad platform;
determining a new location of the mobile ad platform relative to the business of the advertiser located in the particular geographic region;
determining additional direction information based at least in part on the new location, the additional direction information for navigating from the new location of the mobile ad platform to the business; and
sending additional ad information and the additional direction information to the mobile ad platform, the additional ad information and the additional direction information activating the mobile ad platform application to display the particular advertisement together with an updated set of directions for navigating to the business displayed in the particular advertisement.

2. The method as recited in claim 1, wherein the advertiser represents at least one of:
a business entity physically located within the particular geographic region; or
a competitor of the business entity physically located within the particular geographic region.

3. The method as recited in claim 1, further comprising delivering an incentive to the mobile device of the consumer at least partly in response to the receiving of the ad-verification information.

4. The method as recited in claim 1, further comprising providing a payment to an owner of a vehicle on which the mobile ad platform is mounted at least partly in response to at least one of:
display of the advertisement by the mobile ad platform;
receipt, from the consumer, of the ad verification information related to the advertisement displayed by the mobile ad platform; or
redemption of a coupon associated with the advertisement displayed by the mobile ad platform.

5. The method as recited in claim 1, further comprising:
receiving, from the mobile ad platform, subsequent location information indicating that the mobile ad platform is currently located within a different geographic region;
determining a different advertiser associated with the different geographic region;
identifying different ad information related to a different advertisement for the different advertiser; and
providing the different ad information to the mobile ad platform for display of the different advertisement.

6. A mobile ad device comprising:
a publicly visible transportable display that is mounted on an article of clothing or an item worn and orientated outwardly for public consumption of content displayed on the publicly visible transportable display; and
one or more processors configured by executable instructions to:
display an advertisement of an advertiser on the publicly visible display, the advertisement automatically determined based, at least in part, on a defined geographic region in which the mobile ad device is currently located when the mobile ad device is determined to have entered the defined geographic region;
display direction information on the publicly visible display, the direction information for navigating to a business entity identified by the advertisement;
determine a change in a location of the mobile ad device; and
change content of a current advertisement based upon determining the change in the location of the mobile ad device, the changed content comprising changed direction information.

7. The mobile ad device as recited in claim 6, further comprising a communication interface for communicating location information to an advertisement service, the communication interface receiving ad information in response to the location information, the ad information indicating the advertisement to display.

8. The mobile ad device as recited in claim 6, further comprising one or more location sensors for determining the location of the mobile ad device.

9. The mobile ad device as recited in claim 6, wherein the one or more processors are included in a mobile device carried by the person wearing the article of clothing or the item, the mobile device comprising one of a cell phone, a smart phone, an eBook reader, or a tablet computer.

10. The mobile ad device as recited in claim 6, further comprising computer-readable media storing a plurality of advertisements, the one or more processors further configured to obtain the advertisement from the computer-readable media based on at least one of:
location information determined by the mobile ad device; or
ad information received over a network from an advertisement service.

11. One or more computing devices comprising:
one or more processors;
computer-readable media coupled to the one or more processors;
a mobile platform locator component maintained on the computer-readable media and executed on the one or more processors to determine that a mobile ad platform is located within a particular geographic region;
a geographic region mapping component maintained on the computer-readable media and executed on the one or more processors to identify a first advertisement of an advertiser associated with the particular geographic region;
an ad-providing component maintained on the computer-readable media and executed on the one or more processors to provide ad information over a network to the mobile ad platform for displaying, on a publicly visible display, the first advertisement of the advertiser associated with the particular geographic region; and
a user interface component maintained on the computer-readable media and executed on the one or more processors to:
receive ad verification information indicating a number of impressions received for the first advertisement;
provide at least a portion of the ad verification information to the advertiser;
in response to providing the portion of ad verification information, receive a request from the advertiser to change the first advertisement currently displayed on the publicly visible display; and
at least partially in response to the request, send a communication to the mobile ad platform to change the first advertisement currently displayed on the publicly visible display to display a second advertisement of the advertiser.

12. The one or more computing devices as recited in claim 11, wherein execution of the mobile platform locator component to determine that the mobile ad platform is located within the particular geographic region comprises:
receiving location information from the mobile ad platform; and
identifying a geographic region based at least in part on the received location information.

13. The one or more computing devices as recited in claim 12, wherein execution of the geographic region mapping component on the one or more processors to identify the first advertisement of the advertiser associated with the particular geographic region comprises comparing the particular geographic region in which the mobile ad platform is located with mapping information for a plurality of advertisers associated with a plurality of different geographic regions.

14. The one or more computing devices as recited in claim 11, wherein the user interface component maintained on the computer-readable media and executed on the one or more processors receives at least one bid provided by one or more advertisers for a right to place a particular advertisement on the mobile ad platform when the mobile ad platform is located within the particular geographic region.

15. The one or more computing devices as recited in claim 11, wherein the user interface component maintained on the computer-readable media and executed on the one or more processors receives preference settings from an owner of a vehicle on which the mobile ad platform is mounted.

16. The one or more computing devices as recited in claim 11, wherein the user interface component maintained on the computer-readable media and executed on the one or more processors:
receives an indication that a predetermined number of impressions of the second advertisement have occurred; and
in response, terminates display of the second advertisement and displays a different advertisement.

17. The one or more computing devices as recited in claim 16, wherein:
the advertiser is a first advertiser that submitted a winning bid for advertising in the particular geographic region; and
the different advertisement is associated with a second advertiser that submitted a lesser bid for advertising in the particular geographic region.

18. The one or more computing devices as recited in claim 11, wherein the user interface component maintained on the computer-readable media and executed on the one or more processors provides rate information to the advertiser and one or more potential advertisers regarding a current bid amount for placing advertisements in at least the particular geographic region.

19. One or more non-transitory computer-readable media storing computer-executable instructions that, when executed, cause one or more processors of a mobile ad platform to perform operations comprising:
providing location information indicative of a location of the mobile ad platform;
receiving ad information, at least in part, in response to the providing the location information, the ad information associated with an advertiser that bid to provide the ad information based, at least in part, on a geographic region that corresponds to the provided location information;
displaying publicly an advertisement corresponding to the ad information;
providing subsequent location information indicative of a new location of the mobile ad platform within the geographic region;
receiving additional ad information; and
in response to the location of the mobile ad platform changing within the geographic region, changing, based at least in part on the additional ad information, content of a currently displayed advertisement to include at least one of updated written directions or updated symbolic directions for navigating to a location of an advertised business located within the geographic region.

20. The one or more non-transitory computer-readable media as recited in claim 19, wherein the receiving the ad information comprises receiving an advertisement of the advertiser over a network from one of:
an advertisement service; or
an advertiser's website.

21. The one or more non-transitory computer-readable media as recited in claim 19, wherein the receiving the ad information comprises receiving an identity of an advertisement of the advertiser, the operations further comprising obtaining the advertisement from at least one of:
a location on a network; or
a local computer readable media of the mobile ad platform.

22. The one or more non-transitory computer-readable media as recited in claim 19, wherein the providing the location information is in response to an event generated by an application executing on the mobile ad platform.

23. The one or more non-transitory computer-readable media as recited in claim 19, wherein displaying the advertisement corresponding to the ad information comprises displaying the advertisement corresponding to the ad information on a display mounted on a vehicle, the vehicle including the mobile ad platform at the location in the geographic region.

24. The one or more non-transitory computer-readable media as recited in claim 23, wherein the advertisement is from a competitor of a business physically located in the geographic region.

25. A method comprising:
    displaying, by one or more processors, an advertisement on a publicly visible display in a public location;
    displaying, by the one or more processors, a coupon on the publicly visible display with the advertisement, an incentive included in the coupon changing in response to at least one of:
        a passage of time;
        a number of coupons obtained; or
        a number of coupons redeemed;
    displaying information with the advertisement comprising at least one of:
        a number of coupons remaining that are available to be obtained by a consumer; or
        a number of coupons remaining that are available to be redeemed by a consumer; and
    after displaying the information with the advertisement, changing a value of the incentive in the coupon being displayed at least partly in response to a request received from an advertiser associated with the advertisement.

26. The method as recited in claim 25, the displaying the coupon incentive on the publicly visible display further comprising displaying with the advertisement at least one of:
    a time remaining for a consumer to obtain a coupon; or
    a time remaining for a consumer to redeem a coupon.

27. The method as recited in claim 25, the displaying the coupon incentive on the publicly visible display further comprising:
    displaying a first value for the coupon incentive with the advertisement; and
    reducing the first value of the coupon incentive offered with the advertisement to a displayed second lesser value following at least one of:
        passage of a predetermined amount of time;
        providing a predetermined number of coupons at the first value to consumers viewing the advertisement; or
        receipt of confirmation of redemption of a predetermined number of the coupons at the first value.

28. The method as recited in claim 25, further comprising:
    mounting the publicly visible display on a vehicle as part of a mobile ad platform;
    transporting the publicly visible display to a particular geographic region; and
    displaying the advertisement based on a determination that a particular advertiser associated with the advertisement has purchased rights to advertise in the particular geographic region.

29. The one or more computing devices as recited in claim 11, wherein the number of impressions is determined based at least in part on one or more of:
    a number of coupons associated with the first advertisement obtained;
    a number of coupons associated with the first advertisement redeemed;
    a number of access events to a website of the advertiser based on a barcode or a numeric code displayed in the first advertisement; or
    a number of text messages received at a telephone number displayed in the advertisement.

* * * * *